US010386890B2

(12) United States Patent
Myung et al.

(10) Patent No.: US 10,386,890 B2
(45) Date of Patent: Aug. 20, 2019

(54) ELECTRONIC DEVICE HAVING A PLURALITY OF DISPLAYS AND OPERATING METHOD THEREOF

(71) Applicant: Samsung Electronics Co., Ltd., Gyeonggi-do (KR)

(72) Inventors: In Sik Myung, Incheon (KR); Hyun Soo Nah, Seoul (KR); Jung Won Lee, Seoul (KR); Jong Woo Jung, Gyeonggi-do (KR); In Young Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/730,171

(22) Filed: Oct. 11, 2017

(65) Prior Publication Data

US 2018/0101199 A1   Apr. 12, 2018

(30) Foreign Application Priority Data

Oct. 11, 2016   (KR) .................. 10-2016-0131119

(51) Int. Cl.
*G06F 1/16*   (2006.01)
*G06F 3/14*   (2006.01)

(52) U.S. Cl.
CPC .......... *G06F 1/1649* (2013.01); *G06F 1/1692* (2013.01); *G06F 3/1454* (2013.01); *G09G 2340/0492* (2013.01); *G09G 2380/14* (2013.01)

(58) Field of Classification Search
CPC ...... G06F 1/1647; G06F 1/1649; G06F 1/165; G06F 1/1692; G06F 3/1454; G06F 3/147;
(Continued)

(56) References Cited

U.S. PATENT DOCUMENTS 7,433,546 B2   10/2008   Marriott et al.
7,478,323 B2   1/2009   Dowdy
(Continued)

FOREIGN PATENT DOCUMENTS

EP   2 157 771   2/2010
EP   2 843 524   3/2015
(Continued)

OTHER PUBLICATIONS

International Search Report dated Jan. 23, 2018 issued in counterpart application No. PCT/KR2017/011118, 28 pages.
(Continued)

*Primary Examiner* — Tom V Sheng
(74) *Attorney, Agent, or Firm* — The Farrell Law Firm, P.C.

(57) ABSTRACT

Disclosed is an electronic device that includes a first display arranged to face a first direction, a second display arranged to face a second direction, a memory configured to store display data to be output on the first display or the second display, and a processor which executes an application, outputs a function execution screen corresponding to execution of an application on the first display and outputs additional information associated with the function execution screen on the second display while transmitting application execution data according to the execution of the application to an external electronic device, in response to a specified input.

20 Claims, 16 Drawing Sheets

(58) Field of Classification Search
CPC ....... G09G 2340/0492; G09G 2360/04; G09G 2380/14
See application file for complete search history.

(56) References Cited

U.S. PATENT DOCUMENTS

| | | |
|---|---|---|
| 7,525,216 B2 | 4/2009 | Tupman et al. |
| 7,536,565 B2 | 5/2009 | Girish et al. |
| 7,565,036 B2 | 7/2009 | Marriott et al. |
| 7,581,119 B2 | 8/2009 | Tupman et al. |
| 7,593,782 B2 | 9/2009 | Jobs et al. |
| 7,607,019 B2 | 10/2009 | Crandall et al. |
| 7,623,740 B2 | 11/2009 | Marriott et al. |
| 7,627,343 B2 | 12/2009 | Fadell et al. |
| 7,636,071 B2 * | 12/2009 | O'Gorman ............ G06F 1/1616 345/1.1 |
| 7,650,507 B2 | 1/2010 | Crandall et al. |
| 7,680,849 B2 | 3/2010 | Heller et al. |
| 7,686,215 B2 | 3/2010 | Jones et al. |
| 7,706,637 B2 | 4/2010 | Marriott |
| 7,719,830 B2 | 5/2010 | Howarth et al. |
| 7,724,716 B2 | 5/2010 | Fadell |
| 7,751,853 B2 | 7/2010 | Fadell et al. |
| 7,765,326 B2 | 7/2010 | Robbin et al. |
| 7,769,903 B2 | 8/2010 | Robbin et al. |
| 7,783,070 B2 | 8/2010 | Fadell et al. |
| 7,797,242 B2 | 9/2010 | Gautier et al. |
| 7,797,446 B2 | 9/2010 | Heller et al. |
| 7,816,811 B2 | 10/2010 | Tupman et al. |
| 7,823,214 B2 | 10/2010 | Rubinstein et al. |
| 7,827,162 B2 | 11/2010 | Suitts et al. |
| 7,827,259 B2 | 11/2010 | Heller et al. |
| 7,831,199 B2 | 11/2010 | Ng et al. |
| 7,844,498 B2 | 11/2010 | Robbin et al. |
| 7,844,548 B2 | 11/2010 | Robbin et al. |
| 7,853,893 B2 | 12/2010 | Muller et al. |
| 7,856,564 B2 | 12/2010 | Girish et al. |
| 7,860,830 B2 | 12/2010 | Mirrashidi et al. |
| 7,865,745 B2 | 1/2011 | Girish et al. |
| 7,881,564 B2 | 2/2011 | Marriott et al. |
| 7,889,497 B2 | 2/2011 | Jobs et al. |
| 7,890,783 B2 | 2/2011 | Tupman et al. |
| 7,895,661 B2 | 2/2011 | Dowdy et al. |
| 7,899,714 B2 | 3/2011 | Robbin et al. |
| 7,933,117 B2 | 4/2011 | Howarth et al. |
| 7,958,441 B2 | 6/2011 | Heller et al. |
| 7,962,634 B2 | 6/2011 | Cortos et al. |
| 7,966,362 B2 | 6/2011 | Neumann et al. |
| 8,015,237 B2 | 9/2011 | Muller et al. |
| 8,020,762 B2 | 9/2011 | Jones et al. |
| 8,050,714 B2 | 11/2011 | Fadell et al. |
| 8,072,956 B2 | 12/2011 | Fadell |
| 8,078,224 B2 | 12/2011 | Fadell et al. |
| 8,103,973 B2 | 1/2012 | Harris |
| 8,150,937 B2 | 4/2012 | Ng et al. |
| 8,151,259 B2 | 4/2012 | Fadell |
| 8,161,411 B2 | 4/2012 | Robbin et al. |
| 8,161,567 B2 | 4/2012 | Rubinstein et al. |
| 8,165,634 B2 | 4/2012 | Fadell et al. |
| 8,180,895 B2 | 5/2012 | Neumann et al. |
| 8,190,205 B2 | 5/2012 | Fadell et al. |
| 8,200,629 B2 | 6/2012 | Marriott et al. |
| 8,238,971 B2 | 8/2012 | Tertizzi |
| 8,245,924 B2 | 8/2012 | Jones et al. |
| 8,259,444 B2 | 9/2012 | Jobs et al. |
| 8,271,038 B2 | 9/2012 | Fadell et al. |
| 8,291,320 B2 | 10/2012 | Robbin et al. |
| 8,332,668 B2 | 12/2012 | Tupman et al. |
| 8,359,348 B2 | 1/2013 | Robbin et al. |
| 8,370,419 B2 | 2/2013 | Muller et al. |
| 8,412,763 B2 | 4/2013 | Jones et al. |
| 8,458,184 B2 | 6/2013 | Dorogusker et al. |
| 8,473,479 B2 | 6/2013 | Suitts et al. |
| 8,489,468 B2 | 7/2013 | Robbin et al. |
| 8,504,936 B2 | 8/2013 | Gimpl et al. |
| 8,527,892 B2 | 9/2013 | Sirpal et al. |
| 8,588,860 B2 | 11/2013 | Sirpal et al. |
| 8,599,106 B2 | 12/2013 | Gimps et al. |
| 8,648,825 B2 | 2/2014 | Sirpal et al. |
| 8,659,565 B2 | 2/2014 | Sirpal et al. |
| 8,665,215 B2 | 3/2014 | Schrock et al. |
| 8,683,496 B2 | 3/2014 | Reeves et al. |
| 8,698,751 B2 | 4/2014 | Sirpal et al. |
| 8,726,294 B2 | 5/2014 | Benedek et al. |
| 8,732,373 B2 | 5/2014 | Sirpal et al. |
| 8,749,484 B2 | 6/2014 | de Paz et al. |
| 8,773,378 B2 | 7/2014 | Sirpal et al. |
| 8,791,898 B2 | 7/2014 | Rottler et al. |
| 8,793,034 B2 | 7/2014 | Ricci |
| 8,793,608 B2 | 7/2014 | Sirpal et al. |
| 8,812,051 B2 | 8/2014 | Jouin |
| 8,818,725 B2 | 8/2014 | Ricci |
| 8,819,180 B2 | 8/2014 | Reeves et al. |
| 8,819,705 B2 | 8/2014 | Reeves et al. |
| 8,831,826 B2 | 9/2014 | Ricci |
| 8,832,577 B2 | 9/2014 | Sirpal et al. |
| 8,836,842 B2 | 9/2014 | Sirpal et al. |
| 8,838,095 B2 | 9/2014 | Jouin |
| 8,842,057 B2 | 9/2014 | Sirpal et al. |
| 8,842,080 B2 | 9/2014 | Freedman |
| 8,856,679 B2 | 10/2014 | Sirpal et al. |
| 8,862,299 B2 | 10/2014 | Ricci |
| 8,866,748 B2 | 10/2014 | Sirpal et al. |
| 8,866,763 B2 | 10/2014 | Sirpal et al. |
| 8,866,764 B2 | 10/2014 | Schrock |
| 8,868,135 B2 | 10/2014 | Sirpal et al. |
| 8,872,727 B2 | 10/2014 | Reeves et al. |
| 8,872,731 B2 | 10/2014 | Gimpl et al. |
| 8,874,894 B2 | 10/2014 | Reeves et al. |
| 8,875,050 B2 | 10/2014 | Sirpal et al. |
| 8,878,794 B2 | 11/2014 | Sirpal et al. |
| 8,881,053 B2 | 11/2014 | Sirpal et al. |
| 8,884,841 B2 | 11/2014 | Sirpal et al. |
| 8,890,768 B2 | 11/2014 | Sirpal et al. |
| 8,898,443 B2 | 11/2014 | Reeves et al. |
| 8,898,769 B2 | 11/2014 | Chastain et al. |
| 8,903,377 B2 | 12/2014 | Jouin |
| 8,904,165 B2 | 12/2014 | Reeves et al. |
| 8,907,904 B2 | 12/2014 | Sirpal et al. |
| 8,907,906 B2 | 12/2014 | Sirpal et al. |
| 8,910,061 B2 | 12/2014 | Reeves et al. |
| 8,917,221 B2 | 12/2014 | de Paz |
| 8,919,848 B2 | 12/2014 | Ricci |
| 8,922,393 B2 | 12/2014 | Ricci |
| 8,930,846 B2 | 1/2015 | Sirpal et al. |
| 8,933,949 B2 | 1/2015 | Reeves et al. |
| 8,943,434 B2 | 1/2015 | Reeves et al. |
| 8,947,376 B2 | 2/2015 | Sirpal et al. |
| 8,949,722 B2 | 2/2015 | Sirpal et al. |
| 8,949,823 B2 | 2/2015 | Ricci |
| 8,957,905 B2 | 2/2015 | Reeves et al. |
| 8,959,445 B2 | 2/2015 | Sirpal et al. |
| 8,963,379 B2 | 2/2015 | Chen et al. |
| 8,963,840 B2 | 2/2015 | Sirpal et al. |
| 8,963,853 B2 | 2/2015 | Slrpal et al. |
| 8,963,939 B2 | 2/2015 | Yusupov et al. |
| 8,979,159 B2 | 3/2015 | Ricci |
| 8,983,718 B2 | 3/2015 | Ricci |
| 8,984,440 B2 | 3/2015 | Sirpal et al. |
| 8,990,712 B2 | 3/2015 | Reeves et al. |
| 8,990,713 B2 | 3/2015 | Reeves et al. |
| 8,994,671 B2 | 3/2015 | Reeves et al. |
| 8,994,713 B2 | 3/2015 | Sirpal et al. |
| 8,995,982 B2 | 3/2015 | Ricci |
| 8,996,073 B2 | 3/2015 | Sirpal et al. |
| 9,001,103 B2 | 4/2015 | Sirpal et al. |
| 9,001,149 B2 | 4/2015 | Sirpal et al. |
| 9,001,158 B2 | 4/2015 | de Paz |
| 9,003,311 B2 | 4/2015 | Reeves et al. |
| 9,003,426 B2 | 4/2015 | Russello |
| 9,008,856 B2 | 4/2015 | Ricci et al. |
| 9,008,906 B2 | 4/2015 | Ricci |
| 9,013,867 B2 | 4/2015 | Becze et al. |
| 9,014,911 B2 | 4/2015 | Ricci |

(56) References Cited

U.S. PATENT DOCUMENTS

| | | |
|---|---|---|
| 9,019,214 B2 | 4/2015 | Sirpal |
| 9,020,491 B2 | 4/2015 | Ricci |
| 9,026,709 B2 | 5/2015 | Reeves et al. |
| 9,026,923 B2 | 5/2015 | Sirpal et al. |
| 9,026,930 B2 | 5/2015 | Sirpal et al. |
| 9,026,937 B2 | 5/2015 | Sirpal et al. |
| 9,043,073 B2 | 5/2015 | Ricci |
| 9,043,130 B2 | 5/2015 | Ricci |
| 9,046,374 B2 | 6/2015 | Ricci |
| 9,046,992 B2 | 6/2015 | Sirpal |
| 9,047,038 B2 | 6/2015 | Sirpal et al. |
| 9,047,047 B2 | 6/2015 | Visosky |
| 9,047,102 B2 | 6/2015 | Liu |
| 9,049,213 B2 | 6/2015 | Reeves et al. |
| 9,052,800 B2 | 6/2015 | Sirpal et al. |
| 9,052,801 B2 | 6/2015 | Sirpal et al. |
| 9,055,022 B2 | 6/2015 | Ricci |
| 9,058,153 B2 | 6/2015 | Sirpal et al. |
| 9,060,006 B2 | 6/2015 | Yusupov et al. |
| 9,069,518 B2 | 6/2015 | Reeves et al. |
| 9,075,558 B2 | 7/2015 | Reeves et al. |
| 9,086,835 B2 | 7/2015 | Becze et al. |
| 9,086,836 B2 | 7/2015 | Becze et al. |
| 9,092,183 B2 | 7/2015 | Reeves et al. |
| 9,104,365 B2 | 8/2015 | Sirpal et al. |
| 9,104,366 B2 | 8/2015 | Kretz |
| 9,116,655 B2 | 8/2015 | Becze et al. |
| 9,122,440 B2 | 9/2015 | Cassar et al. |
| 9,122,441 B2 | 9/2015 | Reeves et al. |
| 9,128,659 B2 | 9/2015 | Kretz |
| 9,128,660 B2 | 9/2015 | Kretz |
| 9,141,328 B2 | 9/2015 | Jouin |
| 9,146,589 B2 | 9/2015 | Sirpal et al. |
| 9,152,179 B2 | 10/2015 | Sirpal et al. |
| 9,152,371 B2 | 10/2015 | Sirpal et al. |
| 9,158,494 B2 | 10/2015 | Sirpal et al. |
| 9,164,546 B2 | 10/2015 | Sirpal et al. |
| 9,176,701 B2 | 11/2015 | Becze |
| 9,182,788 B2 | 11/2015 | Sirpal et al. |
| 9,182,935 B2 | 11/2015 | Sirpal et al. |
| 9,185,643 B2 | 11/2015 | Jouin |
| 9,195,427 B2 | 11/2015 | Sirpal et al. |
| 9,201,626 B2 | 12/2015 | Sirpal et al. |
| 9,213,516 B2 | 12/2015 | Reeves et al. |
| 9,213,517 B2 | 12/2015 | Sirpal et al. |
| 9,218,154 B2 | 12/2015 | Reeves et al. |
| 9,223,535 B2 | 12/2015 | Teltz |
| 9,229,675 B2 | 1/2016 | Becze et al. |
| 9,235,374 B2 | 1/2016 | Sirpal et al. |
| 9,256,390 B2 | 2/2016 | Sirpal et al. |
| 9,262,117 B2 | 2/2016 | Sirpal et al. |
| 9,280,312 B2 | 3/2016 | Sirpal et al. |
| 9,286,024 B2 | 3/2016 | Becze et al. |
| 9,317,243 B2 | 4/2016 | Becze |
| 9,351,237 B2 | 5/2016 | Selim |
| 9,360,997 B2 | 6/2016 | Missig et al. |
| 9,372,618 B2 | 6/2016 | Sirpal et al. |
| 9,395,945 B2 | 7/2016 | de Paz et al. |
| 9,405,444 B2 | 8/2016 | Reeves |
| 9,474,021 B2 | 10/2016 | Reeves et al. |
| 9,495,012 B2 | 11/2016 | Reeves et al. |
| 9,497,697 B2 | 11/2016 | Becze et al. |
| 9,524,027 B2 | 12/2016 | Sirpal et al. |
| 9,582,235 B2 | 2/2017 | Sirpal et al. |
| 9,594,538 B2 | 3/2017 | Jouin |
| 9,639,320 B2 | 5/2017 | Reeves et al. |
| 9,645,607 B2 | 5/2017 | Becze |
| 9,645,649 B2 | 5/2017 | Sirpal et al. |
| 9,690,385 B2 | 6/2017 | Becze et al. |
| 9,811,302 B2 | 11/2017 | Jouin |
| 2003/0079038 A1 | 4/2003 | Robbin et al. |
| 2004/0224638 A1 | 11/2004 | Fadell et al. |
| 2004/0268451 A1 | 12/2004 | Robbin et al. |
| 2005/0021478 A1 | 1/2005 | Gautier et al. |
| 2005/0050345 A1 | 3/2005 | Dowdy et al. |
| 2005/0071780 A1 | 3/2005 | Muller et al. |
| 2005/0193094 A1 | 9/2005 | Robbin et al. |
| 2005/0240661 A1 | 10/2005 | Heller et al. |
| 2005/0278377 A1 | 12/2005 | Mirrashidi et al. |
| 2006/0015757 A1 | 1/2006 | Tupman et al. |
| 2006/0088228 A1 | 4/2006 | Marriott et al. |
| 2006/0089949 A1 | 4/2006 | Robbin et al. |
| 2006/0100978 A1 | 5/2006 | Heller et al. |
| 2006/0123052 A1 | 6/2006 | Robbin et al. |
| 2006/0152084 A1 | 7/2006 | Tupman et al. |
| 2006/0153040 A1 | 7/2006 | Girish et al. |
| 2006/0155914 A1 | 7/2006 | Jobs et al. |
| 2006/0156236 A1 | 7/2006 | Heller et al. |
| 2006/0156415 A1 | 7/2006 | Rubinstein et al. |
| 2006/0168340 A1 | 7/2006 | Heller et al. |
| 2006/0168351 A1 | 7/2006 | Ng et al. |
| 2006/0174126 A1 | 8/2006 | Crandall et al. |
| 2006/0206811 A1 | 9/2006 | Dowdy |
| 2006/0250764 A1 | 11/2006 | Howarth et al. |
| 2006/0265503 A1 | 11/2006 | Jones et al. |
| 2007/0033295 A1 | 2/2007 | Marriott |
| 2007/0083471 A1 | 4/2007 | Robbin et al. |
| 2007/0123207 A1 | 5/2007 | Terlizzi |
| 2007/0161402 A1 | 7/2007 | Ng et al. |
| 2007/0169087 A1 | 7/2007 | Fadell |
| 2007/0217716 A1 | 9/2007 | Marriott et al. |
| 2007/0239849 A1 | 10/2007 | Robbin et al. |
| 2007/0266028 A1 | 11/2007 | Muller et al. |
| 2007/0266047 A1 | 11/2007 | Cortes et al. |
| 2007/0273609 A1* | 11/2007 | Yamaguchi ........... G06F 3/1423 345/1.1 |
| 2007/0291710 A1 | 12/2007 | Fadell |
| 2007/0299873 A1 | 12/2007 | Jones et al. |
| 2007/0299978 A1 | 12/2007 | Neumann et al. |
| 2008/0013274 A1 | 1/2008 | Jobs et al. |
| 2008/0040379 A1 | 2/2008 | Suitts et al. |
| 2008/0123285 A1 | 5/2008 | Fadell et al. |
| 2008/0125031 A1 | 5/2008 | Fadell et al. |
| 2008/0183757 A1 | 7/2008 | Dorogusker et al. |
| 2008/0260295 A1 | 10/2008 | Marriott et al. |
| 2009/0018682 A1 | 1/2009 | Fadell et al. |
| 2009/0138721 A1 | 5/2009 | Crandall et al. |
| 2009/0172542 A1 | 7/2009 | Girish et al. |
| 2009/0182445 A1 | 7/2009 | Girish et al. |
| 2009/0189460 A1 | 7/2009 | Tupman et al. |
| 2009/0191732 A1 | 7/2009 | Fadell et al. |
| 2009/0216814 A1 | 8/2009 | Marriott et al. |
| 2009/0265750 A1 | 10/2009 | Jones et al. |
| 2009/0278407 A1 | 11/2009 | Tupman et al. |
| 2010/0042654 A1 | 2/2010 | Heller et al. |
| 2010/0048194 A1 | 2/2010 | Park et al. |
| 2010/0054715 A1 | 3/2010 | Marriott et al. |
| 2010/0087099 A1 | 4/2010 | Fadell et al. |
| 2010/0188808 A1 | 7/2010 | Howarth et al. |
| 2010/0198704 A1 | 8/2010 | Fadell |
| 2011/0004594 A1 | 1/2011 | Suitts et al. |
| 2011/0061113 A1 | 3/2011 | Rubinstein et al. |
| 2011/0072161 A1 | 3/2011 | Robbin et al. |
| 2011/0090645 A1 | 4/2011 | Jobs et al. |
| 2011/0106665 A1 | 5/2011 | Robbin et al. |
| 2011/0107124 A1 | 5/2011 | Tupman et al. |
| 2011/0151724 A1 | 6/2011 | Fadell et al. |
| 2011/0151725 A1 | 6/2011 | Fadell et al. |
| 2011/0175805 A1 | 7/2011 | Rottler et al. |
| 2011/0179166 A1 | 7/2011 | Neumann et al. |
| 2011/0296536 A1 | 12/2011 | Muller et al. |
| 2012/0011227 A1 | 1/2012 | Jones et al. |
| 2012/0040719 A1* | 2/2012 | Lee ................... G06F 1/1626 455/557 |
| 2012/0040720 A1* | 2/2012 | Zhang ................. H04M 1/7253 455/557 |
| 2012/0050331 A1 | 3/2012 | Kanda |
| 2012/0081277 A1 | 4/2012 | de Paz |
| 2012/0081278 A1 | 4/2012 | Freedman |
| 2012/0084690 A1 | 4/2012 | Sirpal et al. |
| 2012/0084697 A1 | 4/2012 | Reeves |
| 2012/0084735 A1 | 4/2012 | Sirpal |
| 2012/0084736 A1 | 4/2012 | Sirpal |
| 2012/0084737 A1 | 4/2012 | Gimpl et al. |

(56) References Cited

U.S. PATENT DOCUMENTS

| | | |
|---|---|---|
| 2012/0084738 A1 | 4/2012 | Sirpal |
| 2013/0016040 A1 | 1/2013 | Ahn et al. |
| 2013/0057567 A1* | 3/2013 | Frank .................. G06F 3/1454 345/589 |
| 2013/0076591 A1 | 3/2013 | Sirpal et al. |
| 2013/0076595 A1 | 3/2013 | Sirpal et al. |
| 2013/0076596 A1 | 3/2013 | de Paz et al. |
| 2013/0076597 A1 | 3/2013 | Becze |
| 2013/0076598 A1 | 3/2013 | Sirpal et al. |
| 2013/0076632 A1 | 3/2013 | Sirpal et al. |
| 2013/0076637 A1 | 3/2013 | Teltz |
| 2013/0076638 A1 | 3/2013 | Sirpal et al. |
| 2013/0076653 A1 | 3/2013 | Selim |
| 2013/0076654 A1 | 3/2013 | Sirpal et al. |
| 2013/0076655 A1 | 3/2013 | Sirpal et al. |
| 2013/0076656 A1 | 3/2013 | Sirpal et al. |
| 2013/0076657 A1 | 3/2013 | Reeves et al. |
| 2013/0076658 A1 | 3/2013 | Cassar et al. |
| 2013/0076659 A1 | 3/2013 | Miyaji |
| 2013/0076660 A1 | 3/2013 | Reeves et al. |
| 2013/0076661 A1 | 3/2013 | Reeves et al. |
| 2013/0076662 A1 | 3/2013 | Sirpal et al. |
| 2013/0076663 A1 | 3/2013 | Sirpal et al. |
| 2013/0076664 A1 | 3/2013 | Reeves et al. |
| 2013/0076665 A1 | 3/2013 | Reeves et al. |
| 2013/0076672 A1 | 3/2013 | Sirpal et al. |
| 2013/0076673 A1 | 3/2013 | Sirpal et al. |
| 2013/0076677 A1 | 3/2013 | Kretz |
| 2013/0076678 A1 | 3/2013 | Kretz |
| 2013/0076679 A1 | 3/2013 | Kretz |
| 2013/0076680 A1 | 3/2013 | Jouin |
| 2013/0076681 A1 | 3/2013 | Sirpal et al. |
| 2013/0076682 A1 | 3/2013 | de Paz et al. |
| 2013/0076683 A1 | 3/2013 | Reeves |
| 2013/0076715 A1 | 3/2013 | Selim |
| 2013/0076718 A1 | 3/2013 | Sirpal et al. |
| 2013/0076780 A1 | 3/2013 | Reeves et al. |
| 2013/0076781 A1 | 3/2013 | Sirpal et al. |
| 2013/0076782 A1 | 3/2013 | Sirpal et al. |
| 2013/0076793 A1 | 3/2013 | Sirpal et al. |
| 2013/0076795 A1 | 3/2013 | Sirpal et al. |
| 2013/0076929 A1 | 3/2013 | Sirpal et al. |
| 2013/0076961 A1 | 3/2013 | Sirpal |
| 2013/0076963 A1 | 3/2013 | Sirpal et al. |
| 2013/0076964 A1 | 3/2013 | Sirpal et al. |
| 2013/0077221 A1 | 3/2013 | Becze et al. |
| 2013/0077236 A1 | 3/2013 | Becze et al. |
| 2013/0077260 A1 | 3/2013 | Sirpal et al. |
| 2013/0078959 A1 | 3/2013 | Reeves et al. |
| 2013/0078994 A1 | 3/2013 | Jouin |
| 2013/0078995 A1 | 3/2013 | Jouin |
| 2013/0079054 A1 | 3/2013 | Jouin |
| 2013/0079055 A1 | 3/2013 | Jouin |
| 2013/0079062 A1 | 3/2013 | Sirpal et al. |
| 2013/0079063 A1 | 3/2013 | Jouin |
| 2013/0080759 A1 | 3/2013 | Reeves et al. |
| 2013/0080929 A1 | 3/2013 | Sirpal et al. |
| 2013/0080931 A1 | 3/2013 | Sirpal et al. |
| 2013/0080932 A1 | 3/2013 | Sirpal et al. |
| 2013/0080933 A1 | 3/2013 | Reeves et al. |
| 2013/0080934 A1 | 3/2013 | Reeves et al. |
| 2013/0080935 A1 | 3/2013 | Reeves et al. |
| 2013/0080936 A1 | 3/2013 | Reeves et al. |
| 2013/0080937 A1 | 3/2013 | Sirpal et al. |
| 2013/0080938 A1 | 3/2013 | Reeves et al. |
| 2013/0080939 A1 | 3/2013 | Reeves et al. |
| 2013/0080945 A1 | 3/2013 | Reeves |
| 2013/0080956 A1 | 3/2013 | Sirpal et al. |
| 2013/0080957 A1 | 3/2013 | Sirpal et al. |
| 2013/0080958 A1 | 3/2013 | Sirpal et al. |
| 2013/0080970 A1 | 3/2013 | Sirpal et al. |
| 2013/0082585 A1 | 4/2013 | Becze et al. |
| 2013/0082955 A1 | 4/2013 | Becze et al. |
| 2013/0082957 A1 | 4/2013 | Reeves et al. |
| 2013/0082958 A1 | 4/2013 | Reeves et al. |
| 2013/0083242 A1 | 4/2013 | Sirpal et al. |
| 2013/0083464 A1 | 4/2013 | Becze et al. |
| 2013/0083466 A1 | 4/2013 | Becze et al. |
| 2013/0083467 A1 | 4/2013 | Becze et al. |
| 2013/0083468 A1 | 4/2013 | Becze et al. |
| 2013/0083469 A1 | 4/2013 | Becze et al. |
| 2013/0083470 A1 | 4/2013 | Becze et al. |
| 2013/0083477 A1 | 4/2013 | Becze et al. |
| 2013/0083558 A1 | 4/2013 | Becze |
| 2013/0086480 A1 | 4/2013 | Sirpal et al. |
| 2013/0086492 A1 | 4/2013 | Sirpal et al. |
| 2013/0086493 A1 | 4/2013 | Reeves et al. |
| 2013/0086494 A1 | 4/2013 | Sirpal et al. |
| 2013/0086505 A1 | 4/2013 | de Paz et al. |
| 2013/0088411 A1 | 4/2013 | Reeves et al. |
| 2013/0088446 A1 | 4/2013 | Sirpal et al. |
| 2013/0088447 A1 | 4/2013 | Becze et al. |
| 2013/0091439 A1 | 4/2013 | Sirpal et al. |
| 2013/0097532 A1 | 4/2013 | Reeves et al. |
| 2013/0100001 A1 | 4/2013 | Reeves et al. |
| 2013/0113835 A1 | 5/2013 | Sirpal et al. |
| 2013/0187831 A1 | 7/2013 | Sirpal et al. |
| 2013/0219162 A1 | 8/2013 | Reeves et al. |
| 2014/0068520 A1 | 3/2014 | Missig et al. |
| 2014/0324962 A1* | 10/2014 | Lewin .................. H04L 67/141 709/204 |
| 2015/0009237 A1 | 1/2015 | Sirpal et al. |
| 2015/0062181 A1 | 3/2015 | Lee et al. |
| 2015/0087355 A1 | 3/2015 | Jouin |
| 2015/0194135 A1 | 7/2015 | Higashi et al. |
| 2015/0319282 A1 | 11/2015 | Park et al. |
| 2015/0341686 A1 | 11/2015 | Wen |
| 2016/0041669 A1 | 2/2016 | de Paz et al. |
| 2016/0041704 A1 | 2/2016 | Reeves et al. |
| 2016/0041757 A1 | 2/2016 | Sirpal et al. |
| 2016/0048165 A1 | 2/2016 | Becze |
| 2016/0048222 A1 | 2/2016 | Sirpal et al. |
| 2016/0048300 A1 | 2/2016 | Sirpal et al. |
| 2016/0054869 A1 | 2/2016 | Sirpal et al. |
| 2016/0054880 A1 | 2/2016 | Sirpal et al. |
| 2016/0054970 A1 | 2/2016 | Reeves et al. |
| 2016/0062393 A1 | 3/2016 | Sirpal et al. |
| 2016/0078591 A1 | 3/2016 | Reeeves et al. |
| 2016/0085384 A1 | 3/2016 | Selim |
| 2016/0085406 A1 | 3/2016 | Sirpal et al. |
| 2016/0094648 A1 | 3/2016 | Han et al. |
| 2016/0098064 A1 | 4/2016 | Becze et al. |
| 2016/0110149 A1 | 4/2016 | Sirpal et al. |
| 2016/0116943 A1 | 4/2016 | Becze |
| 2016/0117139 A1 | 4/2016 | Reeves et al. |
| 2016/0127869 A1 | 5/2016 | Lee et al. |
| 2016/0179208 A1 | 6/2016 | Reeves et al. |
| 2016/0179350 A1 | 6/2016 | Reeves et al. |
| 2016/0183047 A1 | 6/2016 | Jouin |
| 2016/0196007 A1 | 7/2016 | Reeves et al. |
| 2016/0266759 A1 | 9/2016 | Reeves |
| 2016/0283063 A1 | 9/2016 | Missig et al. |
| 2016/0291916 A1 | 10/2016 | Sirpal et al. |
| 2016/0291920 A1 | 10/2016 | Sirpal et al. |
| 2016/0291923 A1 | 10/2016 | Sirpal et al. |
| 2016/0313964 A1 | 10/2016 | de Paz et al. |
| 2017/0031641 A1 | 2/2017 | Reeves et al. |
| 2017/0052634 A1 | 2/2017 | Reeves |
| 2017/0255442 A1* | 9/2017 | Kim .................. G06F 3/04883 |
| 2017/0344333 A1* | 11/2017 | Jin .................. G06F 3/1454 |
| 2018/0005603 A1* | 1/2018 | Saroor .................. G06F 3/1454 |
| 2018/0321892 A1* | 11/2018 | Kim .................. G06F 3/1423 |

FOREIGN PATENT DOCUMENTS

| | | |
|---|---|---|
| EP | 2 915 054 | 9/2015 |
| KR | 10-2016-0051947 | 5/2016 |
| KR | 10-2016-0059833 | 5/2016 |
| WO | WO 2014/070106 | 5/2014 |

(56) References Cited

OTHER PUBLICATIONS

European Search Report dated Jun. 4, 2019 issued in counterpart application No. 17860965.7-1221, 9 pages.

* cited by examiner

US 10,386,890 B2

ELECTRONIC DEVICE HAVING A PLURALITY OF DISPLAYS AND OPERATING METHOD THEREOF

PRIORITY

This application claims priority under 35 U.S.C. § 119(a) to a Korean Patent Application filed in the Korean Intellectual Property Office on Oct. 11, 2016 and assigned Serial Number 10-2016-0131119, the contents of each of which are incorporated herein by reference.

BACKGROUND

1. Field of the Disclosure

The present disclosure relates generally to a plurality of a display, and more particularly, to a method for operating the plurality of displays.

2. Description of the Related Art

In recent years, portable electronic devices, such as smartphones, tablet PCs, and the like, have been widely used. Portable electronic devices may have a display on a face thereof and may output, on the display, a screen according to execution of a function. Portable electronic devices may have a limitation in size since portability has to be considered. Accordingly, a plurality of displays employed for a portable electronic device may also have a limitation in size and thus it may be difficult to display a large amount of information. As such, there is a need in the art for a method and apparatus that display large amounts of information using such portable electronic devices.

SUMMARY

Aspects of the present disclosure are to address at least the above-mentioned problems and/or disadvantages and to provide at least the advantages described below. Accordingly, an aspect of the present disclosure is to provide an electronic device having a plurality of displays that facilitates performing specified particular functions through the plurality of displays.

According to embodiments of the present disclosure, an electronic device may include a first display arranged to face a first direction, a second display arranged to face a second direction, a memory that stores display data to be output on the first or second display, and a processor that executes an application, outputs a function execution screen on the first display corresponding to the application, receives a specified input, and outputs, on the second display, additional information associated with the function execution screen while transmitting application execution data according to the execution of the application to an external electronic device.

According to embodiments of the present disclosure, a method for operating of the electronic device is provided that executes an application, outputs, on the first display, a function execution screen corresponding to the application, receives a specified input, transmits application execution data according to the execution of the application to an external electronic device in response to the receiving of the specified input, and outputs, on the second display, additional information associated with the function execution screen.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS OF THE DISCLOSURE

Figure 1:
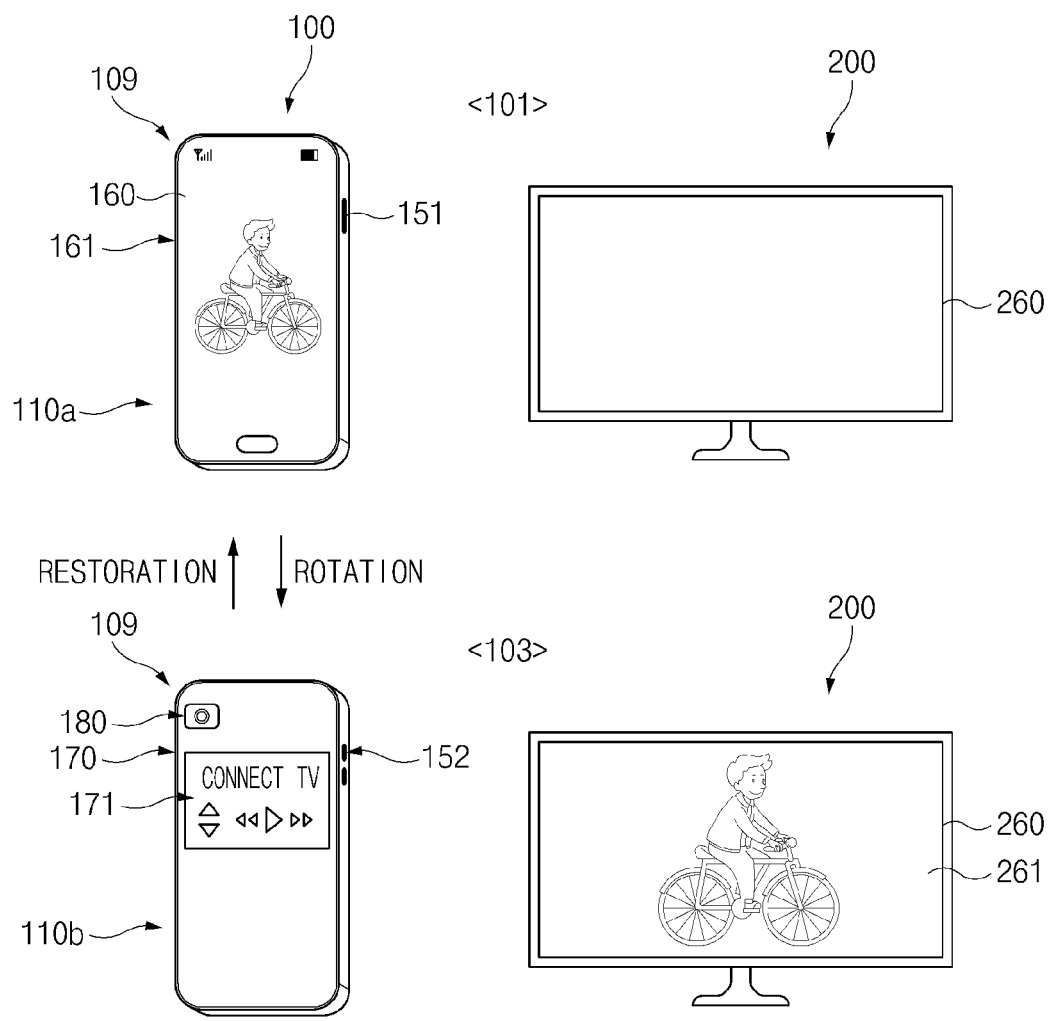
FIG. 1 is a diagram illustrating an operating environment associated with operating an electronic device having a plurality of displays, according to embodiments of the present disclosure.

Embodiments of the present disclosure are described in detail with reference to the accompanying drawings, in which similar reference numerals may be used to refer to similar elements. However, it should be understood that there is no intent to limit the present disclosure to the particular forms disclosed herein; rather those of ordinary skill in the art will recognize that the present disclosure should be construed to cover various modifications, equivalents, and/or alternative embodiments of the present disclosure.

In the present disclosure disclosed herein, the expressions "have", "may have", "include" and "comprise", or "may include" and "may comprise" used herein indicate the existence of corresponding features and elements such as numeric values, functions, operations, or components, but do not exclude the presence of additional features.

As disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms "first", "second", and the like used herein may refer to various elements of embodiments of the present disclosure, but do not limit the elements. For example, such terms are used only to distinguish one element from another element and do not limit the order and/or priority of the elements. For example, "a first user device" and "a second user device" may indicate different user devices regardless of the order or priority thereof. For example, "a first user device" and "a second user device" may indicate different user devices.

It will be understood that when an element, such as a first element, is referred to as being "(operatively or communicatively) coupled with/to" or "connected to" another element, such as a second element, the first element may be directly coupled with/to or connected to the second element or an intervening element, such as a third element, may be present. In contrast, when the first element is referred to as being "directly coupled with/to" or "directly connected to" the second element, it should be understood that there is no intervening third element present.

According to the situation, the expression "configured to" used herein may be interchangeably used with the expression "suitable for", "having the capacity to", "designed to", "adapted to", "made to", or "capable of". The term "configured to" must not indicate only "specifically designed to" in hardware. Instead, the expression "a device configured to" may indicate that the device is "capable of" operating together with another device or other components. A "processor configured to perform A, B, and C" may indicate a dedicated or embedded processor for performing a corresponding operation or a generic-purpose processor, such as a central processing unit (CPU) or an application processor, which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in embodiments of the present disclosure. In some cases, even if terms are defined in the specification, they may not be interpreted to exclude embodiments of the present disclosure.

An electronic device according to embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., HMDs, such as electronic glasses), electronic apparel, electronic bracelets, electronic necklaces, electronic accessories, electronic tattoos, smart watches, and the like.

According to another embodiment, an electronic device may be one or more home appliances. The home appliances may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, an electronic device may include at least one of various portable medical measurement devices including a blood glucose monitoring device, a heartbeat measuring device, a blood pressure measuring device, a body temperature measuring device, a magnetic resonance angiography (MRA), a magnetic resonance imaging (MRI), a computed tomography (CT), scanners, ultrasonic devices, navigation devices, global positioning system (GPS) receivers, event data recorders (EDRs), flight data recorders (FDRs), vehicle infotainment devices, or electronic equipment for vessels including navigation systems and gyrocompasses, avionics, security devices, head units for vehicles, industrial or home robots, automatic teller machines (ATMs), points of sales (POSs) devices, or an Internet of things device including light bulbs, various sensors, electric or gas meters, sprinkler devices, fire alarms, thermostats, street lamps, toasters, exercise equipment, hot water tanks, heaters, boilers, and the like.

According to another embodiment of the present disclosure, an electronic device may include at least one of parts of furniture or buildings/structures, electronic boards, electronic signature receiving devices, projectors, or various measuring instruments including water meters, electricity meters, gas meters, or wave meters, and the like. The electronic device may be one or a combination of the aforementioned devices, and may be a flexible device. The electronic device is not limited to the above-described electronic devices and may include other electronic devices and new electronic devices that are produced due to the development of new technologies.

Hereinafter, an electronic device according to the various embodiments may be described with reference to the accompanying drawings. The term "user" may refer to a person who uses an electronic device or may refer to an artificial intelligence electronic device that uses an electronic device.

FIG. 1 illustrates an operating environment of an electronic device having a plurality of displays, according to an embodiment of the present disclosure.

Referring to FIG. 1, the electronic device operating environment may include an electronic device 100 and an external electronic device 200.

The electronic device 100 may include a first display 160, a second display 170, and a housing 109 having an input interface including a power button 151, a volume button 152, or the like as a side button, a front button, or a rear button. The housing 109 may include an opening area through which the first display 160 is exposed in a first direction and an opening area through which the second display 170 is exposed in the opposite direction to the first direction, and may have side walls disposed between the opening areas.

A processor included in the housing 109 of the electronic device 100 may execute an application in response to a user input or according to a specified schedule and may output, on the first display 160, a function execution screen according to the execution of the application. The electronic device 100 may include a communication interface to establish a communication channel with the external device 200, such as a short range communication channel, a long range communication channel, or the like. According to the state 101, the electronic device 100 may output, on the first display 160, a function execution screen 161 according to execution of a specified application.

According to an embodiment, the first display 160 may be disposed on the front face 110a of the electronic device 100, and the second display 170 may be disposed on the rear face 110b of the electronic device 100. The first display 160 may be disposed on the entire front face 110a of the electronic device 100, or may have a specified size. The second display 170 may be disposed on part of the rear face 110b of the electronic device 100. The second display 170 may be disposed in a specified size or in a size smaller than the size of the first display 160 of the electronic device 100. For example, the first display 160 may include a wider area than the second display 170.

In the state in which the electronic device 100 outputs the function execution screen 161 (or the execution screen) on the first display 160 in response to the execution of the specified application, the electronic device 100 may transmit, to the external electronic device 200, application execution data according to the execution of the application, as in a state 103, if sensor information or a sensor signal that corresponds to an operation of rotating the electronic device 100 to a predetermined angle or more is received. The application execution data may include at least one of display data output on the first display 160 and audio data.

The electronic device 100 may output, on the second display 170, additional information 171 associated with the function execution screen 161 while transmitting the application execution data to the external electronic device 200. The additional information 171 may include, for example, a control screen associated with playback of contents on the function execution screen 161. Alternatively, the additional information 171 may include at least one of objects included in the function execution screen 161. In another case, the additional information 171 may include communication connection information associated with at least one of the objects output on the function execution screen 161. The first display 160 may be automatically turned off while the second display 170 is turned on.

The external electronic device 200 may establish a communication channel with the electronic device 100 and may receive the application execution data associated with the execution of the application from the electronic device 100. The application execution data may include, for example, display data corresponding to the function execution screen 161 output on the first display 160 of the electronic device 100. Alternatively, the application execution data may include audio data according to the execution of the application. According to various embodiments, the external electronic device 200 may transmit the resolution and size of an external display 260 thereof to the electronic device 100 and may receive display data corresponding to the resolution and size from the electronic device 100 to output a function execution screen 261. The function execution screen 261 output on the external display 260 may be substantially the same as the function execution screen 161 output on the first display 160, or may be different from the function execution screen 161 in the resolution, screen aspect ratio, or screen size.

As described above, in the electronic device operating environment according to an embodiment of the present disclosure, if the electronic device 100 obtains sensor information corresponding to a specified gesture motion, such as a flip motion or a motion of turning the electronic device 100 over, the electronic device 100 may transmit, to the external electronic device 200, the application execution data associated with the execution of the application, such as at least one of display data corresponding to the function execution screen 161 output on the first display 160 and audio data associated with the execution of the application, and the electronic device 100 may output, on the second display 170, the additional information 171 associated with the function execution screen 161, thereby facilitating playing back contents.

Figure 2:
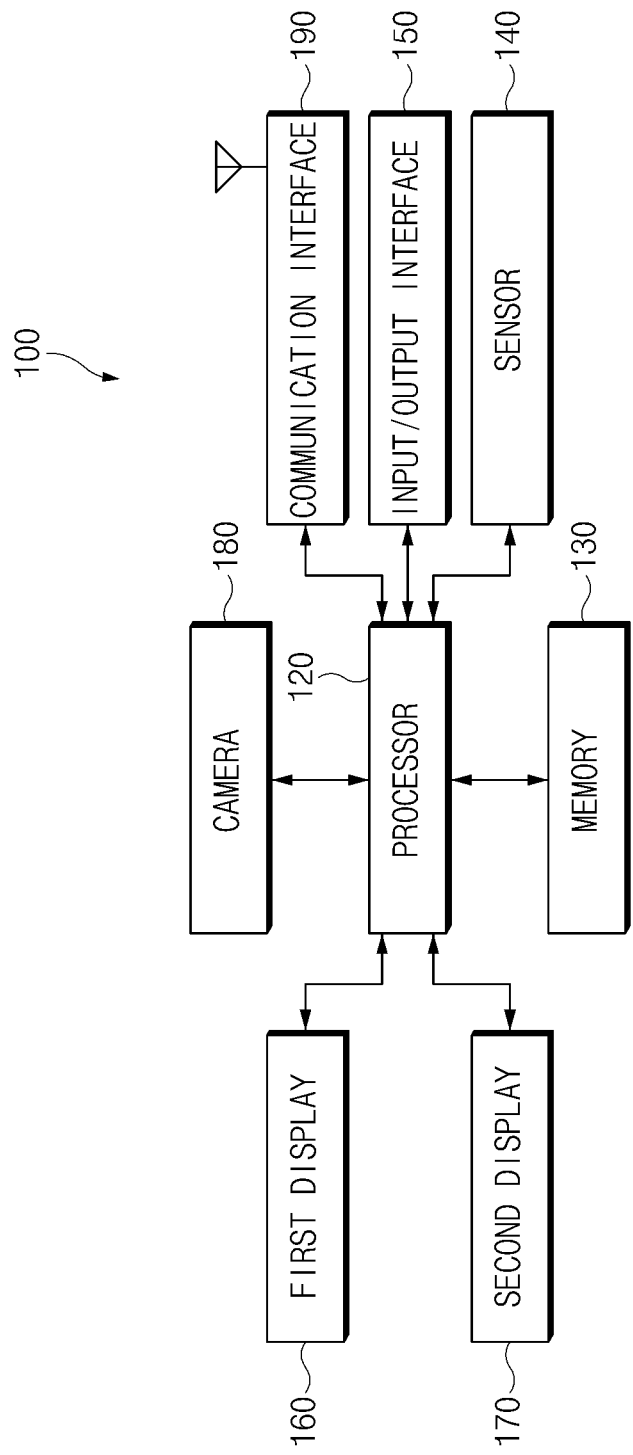
FIG. 2 illustrates a configuration of an electronic device, according to an embodiment of the present disclosure.

FIG. 2 illustrates a configuration of the electronic device, according to an embodiment of the present disclosure.

Referring to FIG. 2, the electronic device 100 of the present disclosure may include a processor 120, a memory 130, a sensor 140, an input/output interface 150, the first display 160, the second display 170, a communication interface 190, and a camera 180. Alternatively, the electronic device 100 may not include the camera 180.

The memory 130 may store at least one set of programs or instructions associated with operating the electronic device 100 and may store an application program that is executable on the electronic device 100. Furthermore, the memory 130 may store at least one of display data and audio data that correspond to execution of a specific application and may perform buffering while the display data is being transmitted to the external electronic device 200. The display data may include data corresponding to the resolution and size of the external electronic device 200. Alternatively, the display data may include data corresponding to the resolution and size of the first display 160. In another case, the memory 130 may store the additional information 171 associated with the function execution screen 161. In embodiments of the present disclosure, the memory 130 may store a list of external electronic devices having a connection history.

The sensor 140 may obtain sensor information associated with a motion of the electronic device 100. The sensor 140 may include at least one of a terrestrial magnetism sensor, an acceleration sensor, gyro sensor, and an illuminance sensor. The sensor 140 may obtain sensor information according to a motion of the electronic device 100 and may transmit the obtained sensor information to the processor 120. According to an embodiment, the sensor 140 may be activated if the first display 160 or the second display 170 is in a turned-on state. The sensor 140 may be deactivated in response to control of the processor 120 if the first display 160 and the second display 170 are in turned-off states.

The input/output interface 150 may generate an input signal corresponding to a user input. The input/output interface 150 may include a power button, a volume button, or the like. In embodiments of the present disclosure, the input/output interface 150 may also include a touch screen, a pressure sensor, a touch sensor, an electromagnetic induction panel, a stylus pen, or the like. The input/output interface 150 may include a physical button type input unit. The input/output interface 150 may include an audio device. The audio device may output audio data, among application execution data, through a speaker if the first display 160 is in a turned-on state. If the second display 170 is in a turned-on state, output of the audio data according to the execution of the application may be omitted, and the audio data may be transmitted to the external electronic device 200.

The first display 160 may be disposed on a side of the housing 109 of the electronic device 100. According to an embodiment, the first display 160 may be exposed through the entire area of the front face 110a of the electronic device 100. The first display 160 may output the function execution screen 161 according to the execution of the application in response to control of the processor 120. The first display 160 may stop outputting the function execution screen 161 in response to a gesture input. The first display 160 may be of a touch screen and may transmit an input signal according to a user touch to the processor 120.

The second display 170 may be disposed on the opposite side to the first display 160 and may be exposed through part of the rear face 110b of the electronic device 100. The second display 170 may output the additional information 171 in response to control of the processor 120. While the second display 170 is outputting the additional information 171, the first display 160 may be turned off or may stop outputting the function execution screen 161. While the first display 160 is outputting the function execution screen 161, the second display 170 may stop outputting the additional information 171 or may be turned off. The second display 170 may be of a touch screen type and may transmit an input signal according to a user touch to the processor 120.

The camera 180 may be disposed on a side of the electronic device 100 and may be activated according to a user operation or in response to execution of a specified application. For example, the camera 180 may be disposed on the rear face 110b of the housing 109 between an upper end of the second display 170 and an upper end of the housing 109.

The communication interface 190 may include circuits for establishing a communication channel with the external electronic device 200. The communication interface 190 may include a short range communication module for establishing a short range communication channel with the external electronic device 200. The short range communication module may include a Bluetooth (BT) communication module, a Wi-Fi direct communication module, or other wireless short range communication technologies. Alternatively, the communication interface 190 may include a communication circuit capable of processing data transmission through a base station. In response to control of the processor 120, the communication interface 190 may transmit display data corresponding to the function execution screen 161 to the external electronic device 200. According to an aspect of the present disclosure, the communication interface 190 may establish a telephone call connection with an external electronic device selected based on the function execution screen 161.

The processor 120 may transmit or process a signal associated with executing a function of the electronic device 100. For example, if the processor 120 is requested to execute an application, the processor 120 may execute the corresponding application and may output the function execution screen 161 according to the execution of the application on the first display 160. The processor 120 may determine an arrangement state of the electronic device 100 based on sensor information received from the sensor 140. If the arrangement state of the electronic device 100 corresponds to a specified state, the processor 120 may stop outputting the function execution screen 161 through the first display 160 and may output the additional information 171 through the second display 170, thereby transmitting screen data corresponding to the function execution screen 161 to the external electronic device 200.

Figure 3:
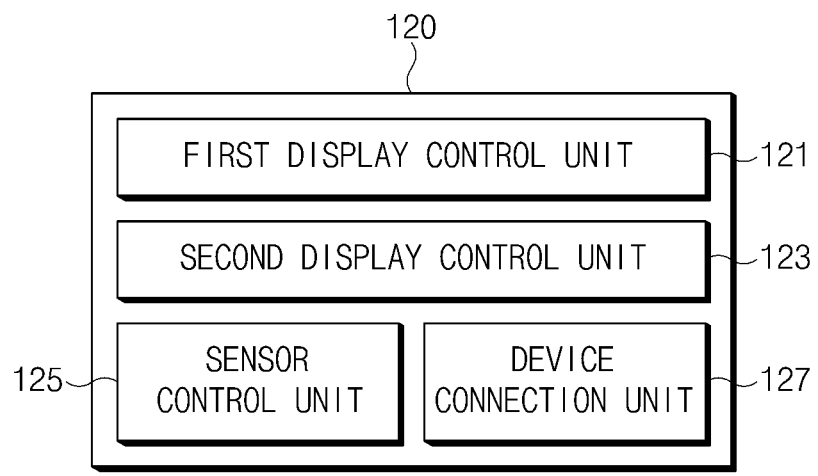
FIG. 3 illustrates a configuration of a processor according to an embodiment of the present disclosure.

FIG. 3 illustrates a processor according to an embodiment of the present disclosure.

Referring to FIG. 3, the processor 120 of the present disclosure may include a first display control unit 121, a second display control unit 123, a sensor control unit 125, and a device connection unit 127.

The first display control unit 121 may control the output of the function execution screen 161 through the first display 160. According to an embodiment of the present disclosure, the first display control unit 121 may output an icon or menu corresponding to an application associated with playback of contents. The first display control unit 121 may execute an application corresponding to a user input and may output, on the first display 160, the function execution screen 161 according to the execution of the application. The first display control unit 121 may determine whether the electronic device 100 satisfies a first specified condition, based on sensor information received from the sensor control unit 125. In a case where the sensor information received from a sensor or the sensor control unit 125 satisfies the first specified condition, such as where a specified sensor signal is received, the first display control unit 121 may stop outputting the function execution screen 161 and may transmit display data associated with the function execution screen 161 to the device connection unit 127. In this operation, the first display control unit 121 may change the first display 160 to a turned-off state while stopping outputting the function execution screen 161. The first display control unit 121 may output the function execution screen 161 on the first display 160 again if sensor information satisfying a second specified condition from the sensor control unit 125 is received.

The second display control unit 123 may control the output of the additional information 171 through the second display 170. The second display control unit 123 may activate the second display 170 if sensor information satisfying the first specified condition from a sensor or the sensor control unit 125 is received. The second display control unit 123 may output, on the activated second display 170, the additional information 171 associated with the function execution screen 161. While outputting the additional information 171, the second display control unit 123 may obtain touch signals received through the second display 170 and may transmit the obtained touch signals to the processor 120. The second display control unit 123 may stop outputting the additional information 171 or may turn-off the second display 170 if sensor information satisfying the second specified condition is received from the sensor control unit 125.

The sensor control unit 125 may activate the sensor 140 of the electronic device 100 according to a specified condition, or may always maintain the sensor 140 in an activated state, and may obtain sensor information. The sensor control unit 125 may determine whether specified sensor information is generated through the sensor 140. For example, the sensor control unit 125 may analyze sensor information to determine whether the electronic device 100 changes from a state in which the front face thereof is oriented in a first direction to a state in which the front face thereof is oriented in a second direction. Alternatively, the sensor control unit 125 may determine whether the electronic device 100 rotates to a specified angle or more.

According to various embodiments, the sensor control unit 125 may determine the direction in which the electronic device 100 rotates, such as whether the electronic device 100 rotates from left to right or from right to left. If sensor information satisfying a specified condition is generated, the sensor control unit 125 may transmit, to the first display control unit 121 or the second display control unit 123, information as to whether the corresponding condition is satisfied.

According to an embodiment of the present invention, in a state in which the function execution screen 161 is output on the first display 160 and the first display 160 is directed upwards or toward the sky, the sensor control unit 125 may determine whether sensor information notifying the user that the first display 160 is turned so as to be directed downwards or toward the ground satisfies the received first condition. If the first condition is satisfied, the sensor control unit 125 may transmit, to the first display control unit 121 and the second display control unit 123, a notification informing that the first condition is satisfied. In contrast, if the first display 160 directed toward the ground is turned so as to be directed toward the sky, the sensor control unit 125 may transmit, to the first display control unit 121 and the second display control unit 123, a notification informing that the second condition is satisfied.

The device connection unit 127 may transmit application execution data to the specified external electronic device 200 in response to the first condition being satisfied. In this regard, the device connection unit 127 may transmit the application execution data to the already connected external electronic device 200. Alternatively, the device connection unit 127 may perform scanning the vicinity of the electronic device 100 such as an operation of transmitting and receiving a signal for searching, or determining, for a neighboring external electronic device. If the specified external electronic device is discovered, the device connection unit 127 may establish a communication channel with the specified external electronic device and may then transmit the application execution data. In this operation, the device connection unit 127 may transmit, automatically or in response to a user input, the application execution data to an external electronic device having a recent connection history in a list of a plurality of discovered external electronic devices or may transmit, automatically or in response to a user input, the application execution data to an external electronic device having the greatest number of connection histories. In another case, the device connection unit 127 may detect an external electronic device closest to the electronic device 100 among the discovered external electronic devices by determining the distance between the electronic device 100 and the external electronic devices on the basis of sensor information. The device connection unit 127 may select an external electronic device located at the shortest distance from the electronic device 100 or one of a plurality of external electronic devices within a predetermined distance automatically or in response to a user input and may transmit the application execution data to at least one selected external electronic device. In another case, the device connection unit 127 may identify wireless signal strength according to an exchange of signals with external electronic devices and may select, automatically or in response to a user input, an external electronic device having a wireless signal strength greater than or equal to a specified strength or an external electronic device having the best wireless signal strength.

According to various embodiments, if the first condition is satisfied, the device connection unit 127 may select, automatically or in response to a user input, specified connection information among external electronic device connection information acquired from the function execution screen 161 and may attempt to establish a communication channel based on the selected connection information.

In the case where the second condition is satisfied, the device connection unit 127 may stop transmitting the application execution data to the external electronic device 200. The device connection unit 127 may deactivate the communication channel established with the external electronic device 200. In the case where the second condition is satisfied while a communication channel is being established, the device connection unit 127 may stop attempting to establish the communication channel. For example, in the case where sensor information satisfies the second condition in attempting to establish a communication channel, such as attempting to establish a telephone call connection, based on selected connection information such as a telephone number, the device connection unit 127 may stop attempting to establish the communication channel.

An electronic device according to an embodiment of the present disclosure may include a first display arranged to face a first direction, a second display arranged to face a second direction, a memory that stores display data to be output on the first or second display, and a processor electrically connected with the first display, the second display, and the memory. The processor may be configured to output a function execution screen on the first display in response to execution of an application and to output additional information associated with the function execution screen on the second display while transmitting application execution data according to the execution of the application to a specified external electronic device, in response to receiving sensor information corresponding to an operation of rotating the electronic device to a specified angle or more.

The processor may be configured to scan the vicinity of the electronic device for an external electronic device corresponding to the type of application and to transmit, to the external electronic device discovered by the scan operation, at least one of audio data and video data according to the type of application, when receiving the sensor information.

The processor may be configured to output a search failure message on the second display in the case where the processor fails to discover an external electronic device corresponding to the type of application.

The processor may be configured to obtain information about the resolution and size of an external electronic device and to transmit, to the external electronic device, video data corresponding to the resolution and size of the external electronic device.

An electronic device according to an embodiment of the present disclosure may include a first display arranged to face a first direction, a second display arranged to face a second direction, a memory that stores display data to be output on the first or second display, and a processor electrically connected with the first display, the second display, and the memory. The processor may be configured to output a function execution screen on the first display in response to execution of an application, to obtain connection information necessary for a telephone call connection based on objects output on the function execution screen, in response to receiving sensor information corresponding to an operation of rotating the electronic device to a specified angle or more, and to output the obtained connection information on the second display.

The processor may be configured to attempt to establish a telephone call connection with an external electronic device based on connection information selected according to a specified condition, among the obtained connection information.

An electronic device according to an embodiment of the present disclosure may include a first display arranged to face a first direction, a second display arranged to face a second direction, a memory configured to store display data to be output on the first display or the second display, and a processor electrically connected with the first display, the second display, and the memory, wherein the processor is configured to execute an application, output, on the first display, a function execution screen corresponding to the application, receive a specified input, and output, on the second display, additional information associated with the function execution screen while transmitting application execution data according to the execution of the application to an external electronic device.

The processor may be configured to turn off the first display and turn on the second display in a case where the second display is arranged to face the first direction in the state in which the first display faces the first direction, and output the additional information on the second display.

The processor may be configured to obtain a list of connectable external electronic devices if the specified input is received, output the obtained list of the external electronic devices on the second display, select an external electronic device according to a specified condition, and transmit the application execution data to the selected external electronic device.

The processor may be configured to receive a user input, transmit the application execution data to a specific external electronic device selected by a user input, wherein the specific external electronic device includes any one of an external electronic device having a recent connection history, an external electronic device having the greatest number of connection histories, an external electronic device having a wireless signal strength higher than or equal to a specified strength, an external electronic device having the best wireless signal strength, or an external electronic device located at the shortest distance from the electronic device, among the external electronic devices in the obtained list.

The processor may be configured to output a control screen associated with operation control of the external electronic device as the additional information while the application execution data is being output through the external electronic device.

The processor may be configured to receive a user input associated with an operation control and transmit control information according to a user input to the external electronic device.

The processor may be configured to output the additional information including a control screen associated with playback control of display data that is associated with the application execution data while the application execution data is being output through the external electronic device.

The processor may be configured to obtain the type of application, determine an external electronic device associated with the type of application, establish a connection with the determined external electronic device, and transmit the application execution data to the determined external electronic device.

The processor may be configured to establish a communication channel with at least one external electronic device capable of outputting audio data according to the execution of the application in a case that the application is an audio output application and transmit the audio data to the at least one external electronic device.

The processor may be configured to establish a communication channel with at least one external electronic device capable of outputting audio and video data in a case that the application is an audio-video output application and transmit audio data and video data to the at least one external electronic device.

Figure 4:
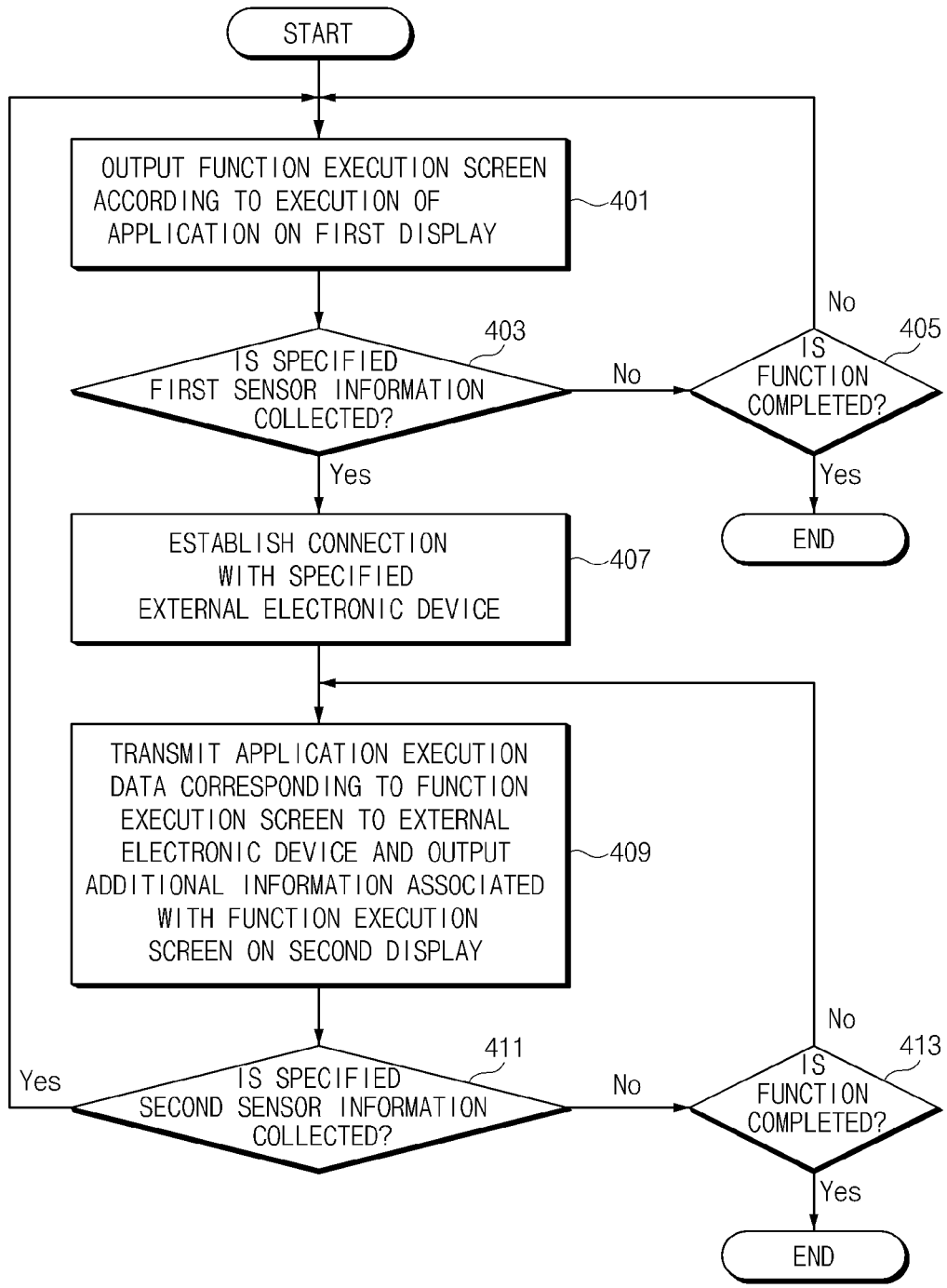
FIG. 4 is a flowchart illustrating a method for operating an electronic device having a plurality of displays, according to an embodiment of the present disclosure.

FIG. 4 is a flowchart illustrating a method for operating the electronic device having the plurality of displays, according to an embodiment of the present disclosure.

Referring to FIG. 4, in operation 401, the processor 120, including the first display control unit 121, may output, on the first display 160, the function execution screen 161 according to execution of an application. In this regard, the processor 120 may output a menu or icon associated with execution of at least one application and may execute the application in response to a user input. Alternatively, the processor 120 may activate an application associated with a home screen or a lock screen in response to a user input and may output, on the first display 160, the home screen or the lock screen as the function execution screen 161.

In operation 403, the processor 120, including the sensor control unit 125, may determine whether specified first sensor information is obtained. In the case where the specified first sensor information is not obtained, the processor 120 may proceed to operation 405 to determine whether an input event associated with completion of the function occurs, and in the case where there is no function completion input event, the processor 120 may return to the state prior to operation 401. The first sensor information may include, for example, sensor information or a sensor signal that corresponds to an operation of turning the electronic device 100 over to change the directions in which the front and rear faces of the electronic device 100 are oriented.

If the specified first sensor information is obtained, the processor 120, including the device connection unit 127 may, in operation 407, establish a connection with the specified external electronic device 200. In this regard, the processor 120 may determine whether a communication channel with the specified external electronic device 200 has been established. In the case where there is no established communication channel, the processor 120 may perform an operation associated with establishing a communication channel with the corresponding external electronic device 200. For example, the processor 120 may perform a scan operation, may search for, or determine, the external electronic device 200 set as a default, and may establish a communication channel if the external electronic device 200 set as a default is present. In the case where there is no external electronic device 200 set as a default, the processor 120 may perform a scan operation to determine whether an external electronic device having the next highest priority is present, and may establish a communication channel in the case where an external electronic device having the next highest priority is present. In the case where the specified external electronic device 200 is not present around the electronic device 100, or in the case where it is impossible to establish a communication channel, the processor 120 may output guidance information notifying that there is no external electronic device 200 around the electronic device 100 or communication is impossible.

In operation 409, the processor 120, including the device connection unit 127 and the second display control unit 123, may transmit application execution data corresponding to the function execution screen 161 to the external device. Application execution data may include at least one of display data and audio data associated with the function execution screen 161. The processor 120, including the device connection unit 127 and the second display control unit 123, may output the additional information 171 associated with the function execution screen 161 on the second display 170. The processor 120 may output, on the second display 170, a control screen associated with control over the playback of the function execution screen 161 as the additional information 171. According to embodiments, while outputting a home screen, on which at least one icon or menu is output, as the function execution screen 161, the processor 120 may, in operation 409, output some of the plurality of icons or menus present on the home screen, including icons or menus used by a user frequently or a predetermined number or more of times, on the second display 170 as the additional information 171. In the state in which a lock screen is output as the function execution screen 161, the processor 120 may, in operation 409, output only a region including a lock pattern on the second display 170 as the additional information 171.

In operation 411, the processor 120, including the sensor control unit 125, may determine whether specified second sensor information is obtained. In the case where the specified second sensor information is not obtained, the processor 120 may, in operation 413, determine whether an input event associated with completion of the function occurs. The second sensor information may include, for example, sensor information that is different from, or the same as, the first sensor information in the direction. In the case where the first sensor information is sensor information according to an operation of rotating the electronic device 100 from left to right, the second sensor information may include sensor information according to an operation of rotating the electronic device 100 from right to left. Alternatively, in the case where the first sensor information is sensor information according to an operation of rotating the electronic device 100 from left to right, the second sensor information may include sensor information according to an operation of rotating the electronic device 100 from left to right again after the first sensor information is generated. While the sensor information according to the operation of rotating the electronic device 100 from left to right or from right to left has been described above, the first sensor information and the second sensor information of the present disclosure are not limited thereto. For example, the first or second sensor information may include sensor information corresponding to an operation required to direct the first display 160 or the second display 170 in a specified particular direction.

If there is no input event associated with completion of the function, the processor 120 may return to the state prior to operation 409 to perform the subsequent operations again. In the case where the specified second sensor information is received, the processor 120 may return to the state prior to operation 401 to perform the subsequent operations again.

Figure 5:
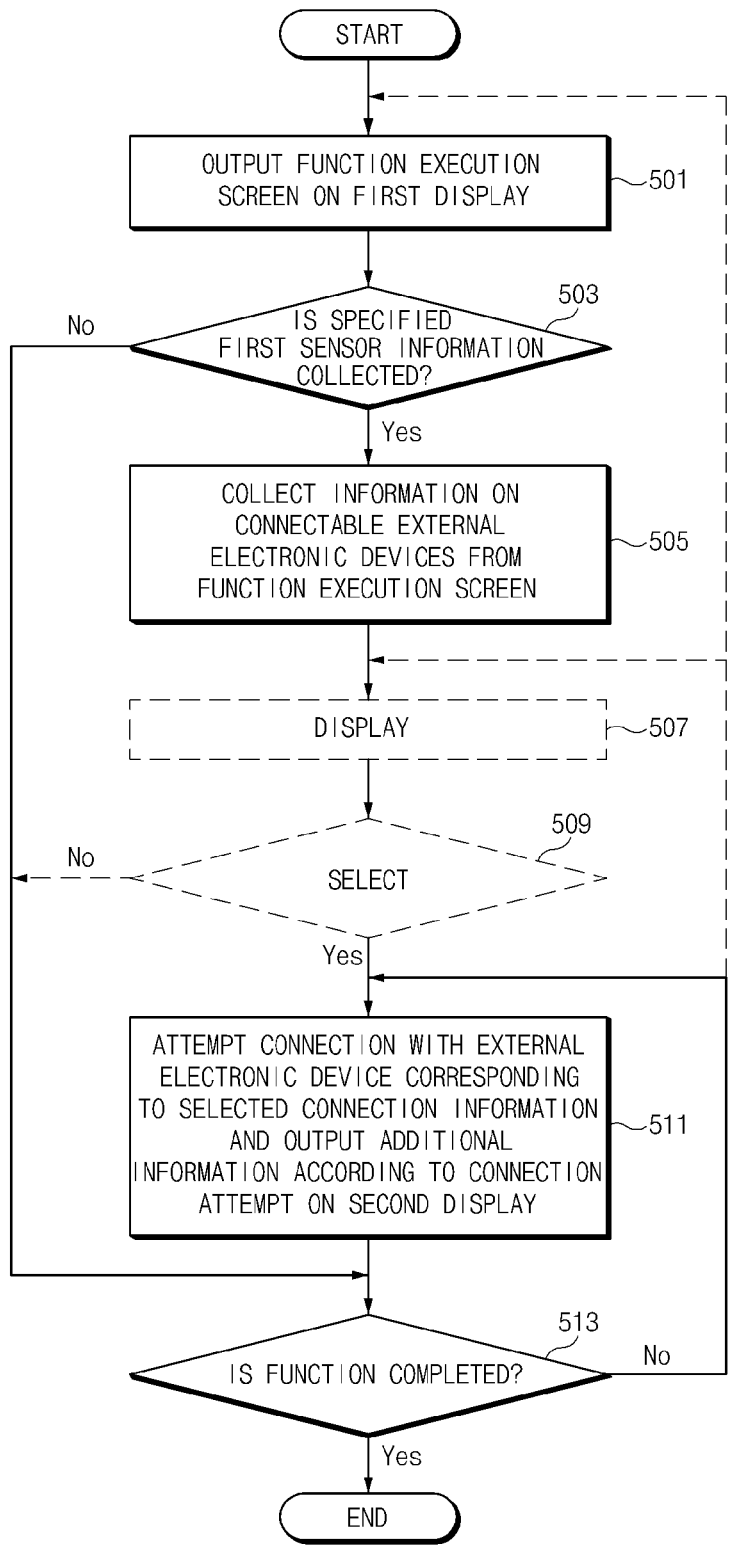
FIG. 5 is a flowchart illustrating a method for operating an electronic device having a plurality of displays, according to an embodiment of the present disclosure.

FIG. 5 is a flowchart illustrating a method for operating the electronic device having the plurality of displays, according to an embodiment of the present disclosure.

Referring to FIG. 5, in operation 501, the processor 120, including the first display control unit 121, may output the function execution screen 161 on the first display 160. For example, if an event, such as a user input or the coming of a specified schedule appointment, for requesting execution of a specified application occurs, the processor 120 may execute the application and may output, on the first display 160, the function execution screen 161 according to the execution of the application. The function execution screen 161 may include, for example, connection information of at least one connectable external electronic device.

In operation 503, the processor 120, including the sensor control unit 125, may determine whether specified first sensor information is obtained. If the specified first sensor information is obtained, the processor 120, including the device connection unit 127, may, in operation 505, obtain information on the connectable external electronic devices from the function execution screen. For example, the processor 120 may obtain connection information, such as telephone number information, that is connectable through the communication interface 190, among objects included in the function execution screen 161.

In operation 507, the processor 120, including the second display control unit 123, may output, on the second display 170, the obtained connection information of the connectable external electronic devices. In this operation, the processor 120 may output a list of telephone numbers or may output the names of the external electronic devices or information associated with the positions of the external electronic devices together.

In operation 509, the processor 120, including the device connection unit 127, may determine whether a user input occurs to select connection information of any one external electronic device in the list. Alternatively, the processor 120 may automatically select an external electronic device satisfying a specified condition, among the detected external electronic devices in the list. The specified condition may include, for example, the presence or absence of connection information having a previous connection history. Alternatively, the specified condition may include a condition for determining, or searching for, an external electronic device having the most recent connection history or a condition for searching for an external electronic device having connection information by which a connection has been attempted most frequently, among the external electronic devices.

In operation 511, the processor 120, including the device connection unit 127 and the second display control unit 123, may attempt a connection with the external electronic device corresponding to the selected connection information and may output, on the second display 170, additional information according to the connection attempt. In the case where a telephone call connection is attempted through the communication interface 190 of the electronic device 100, the additional information may include a screen associated with the telephone call connection attempt.

Operations 507 and 509 described above may be omitted. In the case where operations 507 and 509 are omitted, if the connection information of the connectable external electronic devices is obtained, the processor 120 of the present disclosure may attempt a connection with one external electronic device according to a specified condition, or may sequentially or simultaneously attempt access to the discovered connection information. For example, the processor 120 may attempt a connection with the highest priority item in the connection information list.

In operation 513, the processor 120 may determine whether an input event associated with completion of the function occurs. If there is no input event associated with completion of the function, the processor 120 may return to the state prior to operations 501, 507, or 511 according to the previous state. For example, in the case where the specified first sensor information is not obtained and no function completion event occurs, the processor 120 may return to the state prior to operation 501 to perform the subsequent operations again. In the case where there is no user input to select connection information and no function completion event occurs, the processor 120 may return to the state prior to operation 507 to perform the subsequent operations again. After operation 511, the processor 120 may continue with operation 511 in the case where there is no event associated with completion of the function. If specified second sensor information is obtained while operation 511 is being performed, the processor 120 may stop attempting a telephone call connection or may complete a telephone call connection state, and may return to operation 501.

Figure 6:
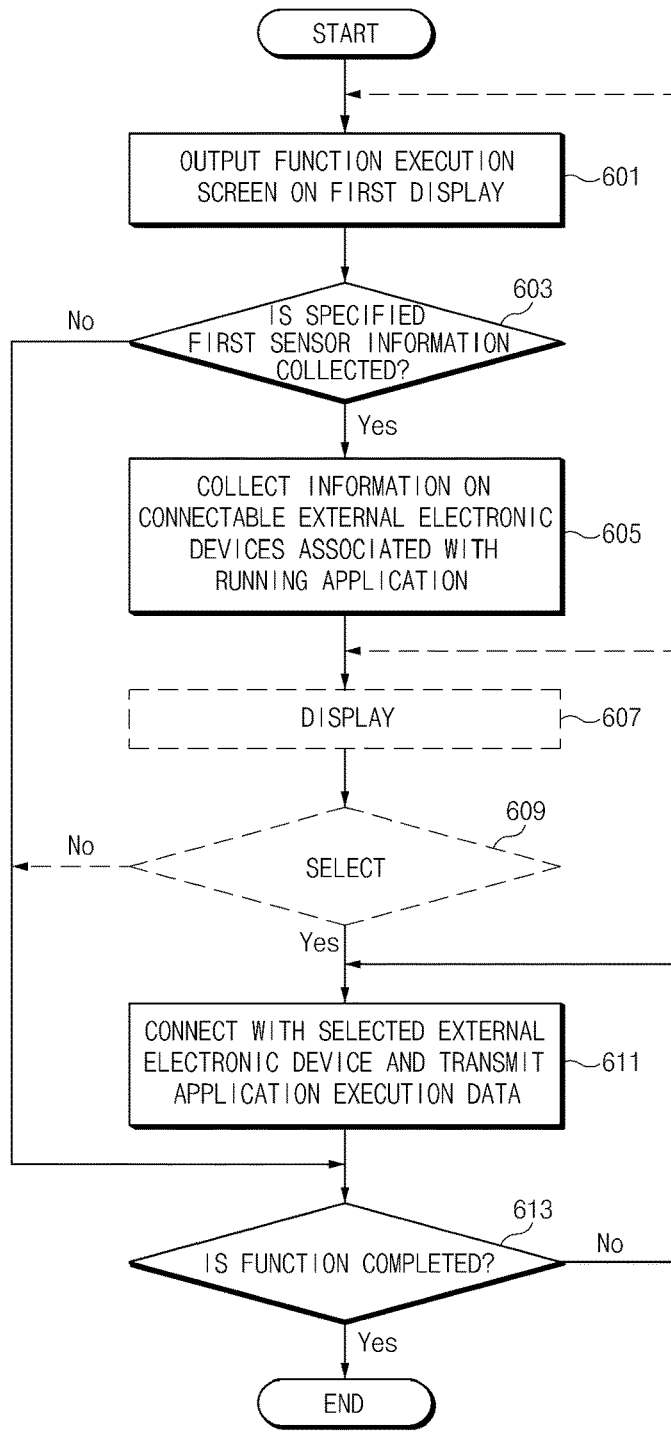
FIG. 6 is a flowchart illustrating a method for operating an electronic device having a plurality of displays in relation to a function execution screen, according to an embodiment of the present disclosure.

FIG. 6 is a flowchart illustrating a method for operating the electronic device having the plurality of displays in relation to a function execution screen, according to an embodiment of the present disclosure.

Referring to FIG. 6, in operation 601, the processor 120, including the first display control unit 121, may output a function execution screen on the first display 160. In operation 603, the processor 120, including the sensor control unit 125, may determine whether specified first sensor information is obtained. In the case where the specified first sensor information is obtained, the processor 120, including the device connection unit 127, may, in operation 605, obtain information on connectable external electronic devices associated with a running application. For example, the processor 120 may determine what application is running, and whether the currently running application is an audio playback application, a video playback application, a document/image editing application, or a music editing application. In the case where an audio playback application is running, the processor 120 may scan the vicinity of the electronic device 100 for an external electronic device, such as an external speaker, TV, or the like. In the case where a video playback application is running, the processor 120 may scan the vicinity of the electronic device 100 for an external electronic device, such as a TV, a computer, a tablet PC, a notebook computer, a beam projector, and the like. In the case where a music editing application is running, the processor 120 may scan the vicinity of the electronic device 100 for an electronic piano, a synthesizer, a hardware jukebox, or the like that is capable of performing communication. The list of the connectable external electronic devices may be varied according to a user's settings or may be varied according to intentions of a designer for the electronic device 100.

In operation 607, the processor 120, including the second display control unit 123, may output, on the second display 170, the obtained external electronic device information list. In this operation, the processor 120 may dispose high-priority items on an upper side of the second display 170 according to the usage history. If an external electronic device associated with the type of application is not present, the processor 120 may inform that there is no connectable external electronic device. Alternatively, the processor 120 may again perform the scan operation a specified number of times.

In operation 609, the processor 120, including the device connection unit 127, may determine whether a user input occurs to select any one item in the external electronic device information list. In the case where an item satisfying a specified condition is present, the selection operation may be replaced by an operation of automatically selecting an external electronic device corresponding to the relevant item, as described above with reference to FIG. 5.

If an external electronic device is selected in response to a user input, the processor 120 may, in operation 611, establish a connection with the selected external electronic device and may transmit application execution data to the selected external electronic device. The processor 120 may vary the type of communication channel to be connected, according to the type of connected external electronic device and the characteristic of application execution data to be transmitted. For example, in the case where the processor 120 has to transmit audio data, the processor 120 may establish a communication connection based on a first communication interface such as Bluetooth (BT), which has a relatively low data transfer rate. In the case where the processor 120 has to transmit display data and audio data, the processor 120 may establish a communication connection based on a second communication interface such as Wi-Fi direct communication having a higher data transfer rate than the first communication interface. The processor 120 may output specified additional information on the second display 170 while transmitting the application execution data. The additional information may include a control screen for controlling the volume of the external electronic device, a screen for controlling the screen size or screen aspect ratio of the external electronic device, or the like. Alternatively, the additional information may include a control screen for controlling turn-on or turn-off of the external electronic device.

In operation 613, the processor 120 may determine whether an input event associated with completion of the function occurs. If there is no input event associated with completion of the function, the processor 120 may return to the state prior to operations 601, 607, or 611 according to the previous state. For example, in the case where the specified first sensor information is not obtained and no function completion event occurs, the processor 120 may return to the state prior to operation 601 to perform the subsequent operations again, and in the case where there is no user input associated with selection of an external electronic device and no function completion event occurs, the processor 120 may return to the state prior to operation 607 to perform the subsequent operations again. After operation 611, the processor 120 may continue with operation 611 in the case where there is no event associated with completion of the function.

Figure 7:
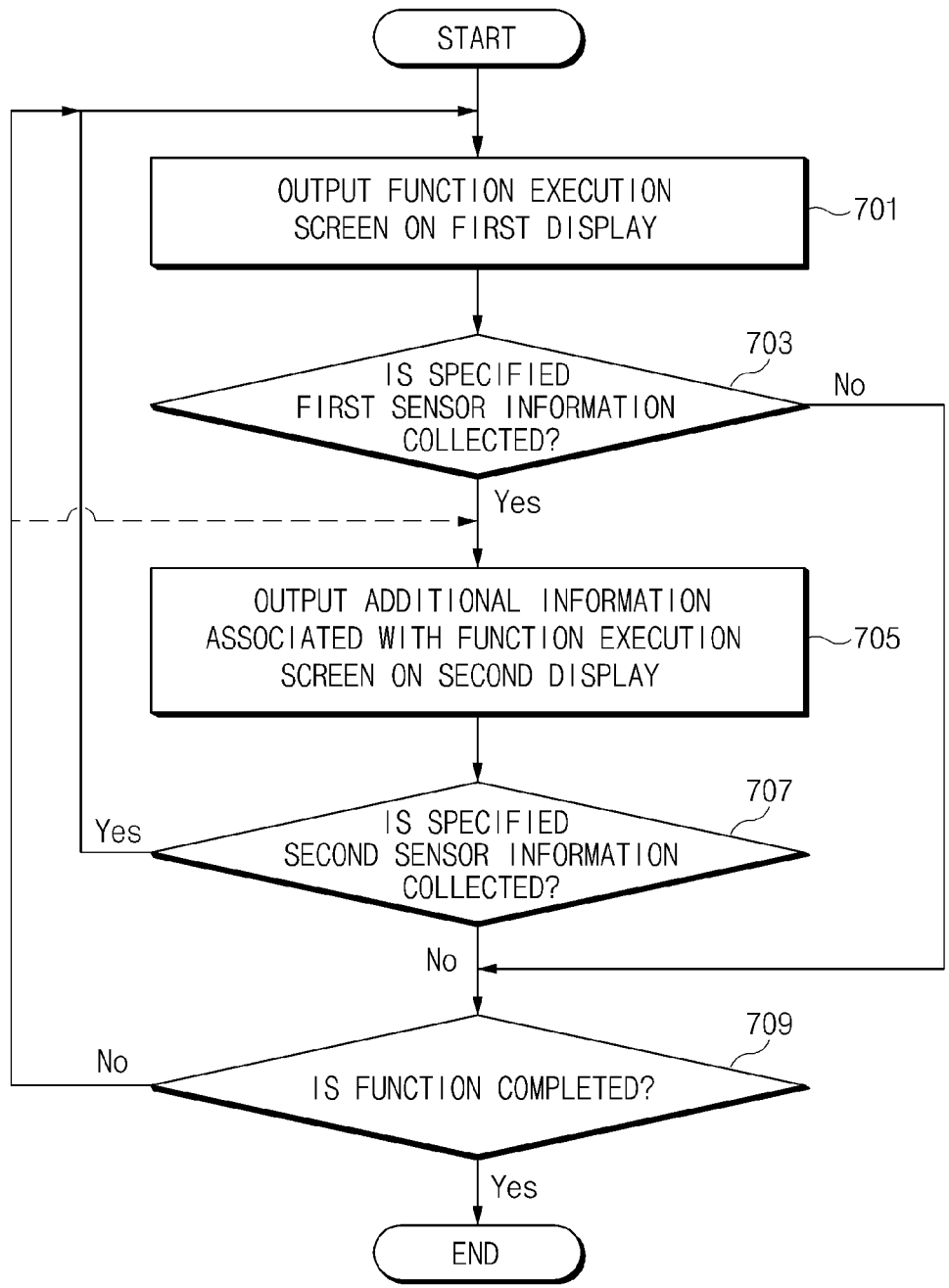
FIG. 7 is a flowchart illustrating a method for operating an electronic device having a plurality of displays based on sensor information, according to an embodiment of the present disclosure.

FIG. 7 is a flowchart illustrating a method for operating the electronic device having the plurality of displays based on sensor information, according to an embodiment of the present disclosure.

Referring to FIG. 7, in operation 701, the processor 120, including the first display control unit 121 may output the function execution screen 161 on the first display 160. In this operation, the processor 120 may maintain the second display 170 in a turned-off state. Alternatively, the processor 120 may activate the sensor 140.

In operation 703, the processor 120, including the sensor control unit 125 may determine whether specified first sensor information is obtained. If the specified first sensor information is obtained, the processor 120, including the second display control unit 123 may, in operation 705, output the additional information 171 associated with the function execution screen 161 on the second display 170. For example, the processor 120 may output, on the second display 170, an object indicating a direction as the additional information 171 in relation to the function execution screen 161. Alternatively, the processor 120 may magnify a region of the function execution screen 161 to a specified size and may output, on the second display 170, the magnified region as the additional information 171.

In operation 707, the processor 120, including the sensor control unit 125 may determine whether specified second sensor information is obtained. If the specified second sensor information is obtained, the processor 120 may return to the step prior to operation 701 to output the function execution screen on the second display 170. In the case where the specified second sensor information is not obtained, the processor 120 may, in operation 709, determine whether an input event associated with completion of the function occurs. If there is no input event associated with completion of the function, the processor 120 may return to the state prior to operations 701 or 705 according to the previous state to perform the subsequent operations again.

According to various embodiments, a method for operating an electronic device including a first display arranged to face a first direction and a second display arranged to face a second direction is provided. The method may include executing an application, outputting, on the first display, a function execution screen corresponding to the application, receiving a specified input, transmitting application execution data according to the execution of the application to an external electronic device in response to the receiving of the specified input, and outputting, on the second display, additional information associated with the function execution screen.

The receiving of the specified input may include receiving sensor information according to an operation of arranging the second display to allow the second display to face the first direction in the state in which the first display faces the first direction, and wherein the outputting of the additional information includes turning off the first display and turning on the second display and outputting the additional information on the second display.

The transmitting of the application execution data may include obtaining a list of connectable external electronic devices, outputting the obtained list of the external electronic devices on the second display, selecting an external electronic device according to a specified condition, and transmitting the application execution data to the selected external electronic device.

The selecting of the external electronic device may include selecting an external electronic device selected by a user input, wherein the external electronic device may include any one of an external electronic device having a recent connection history, an external electronic device having a wireless signal strength higher than or equal to a specified strength, an external electronic device having the best wireless signal strength, an external electronic device located at the shortest distance from the electronic device, and an external electronic device having the greatest number of connection histories, among the external electronic devices in the obtained list.

The outputting of the additional information may include outputting a control screen associated with operation control of the external electronic device as the additional information while the application execution data is being output through the external electronic device.

The method may further include receiving a user input associated with an operation control and transmitting control information according to the user input to the external electronic device.

The outputting of the additional information may include outputting the additional information including a control screen associated with playback control of display data that is associated with the application execution data while the application execution data is being output through the external electronic device.

The transmitting of the application execution data may include obtaining the type of application, determining for an external electronic device associated with the type of application, connecting with the determined external electronic device, and transmitting the application execution data to the determined external electronic device.

The transmitting of the application execution data may include establishing a communication channel with at least one external electronic devices capable of outputting audio data according to the execution of the application, and transmitting the audio data to the at least one external electronic devices in a case that the application is an audio output application.

The transmitting of the application execution data may include establishing a communication channel with at least one external electronic device capable of outputting audio-video data in a case that the application is an audio-video data output application and transmitting the audio data and the video data to the at least one external electronic device.

Figure 8:
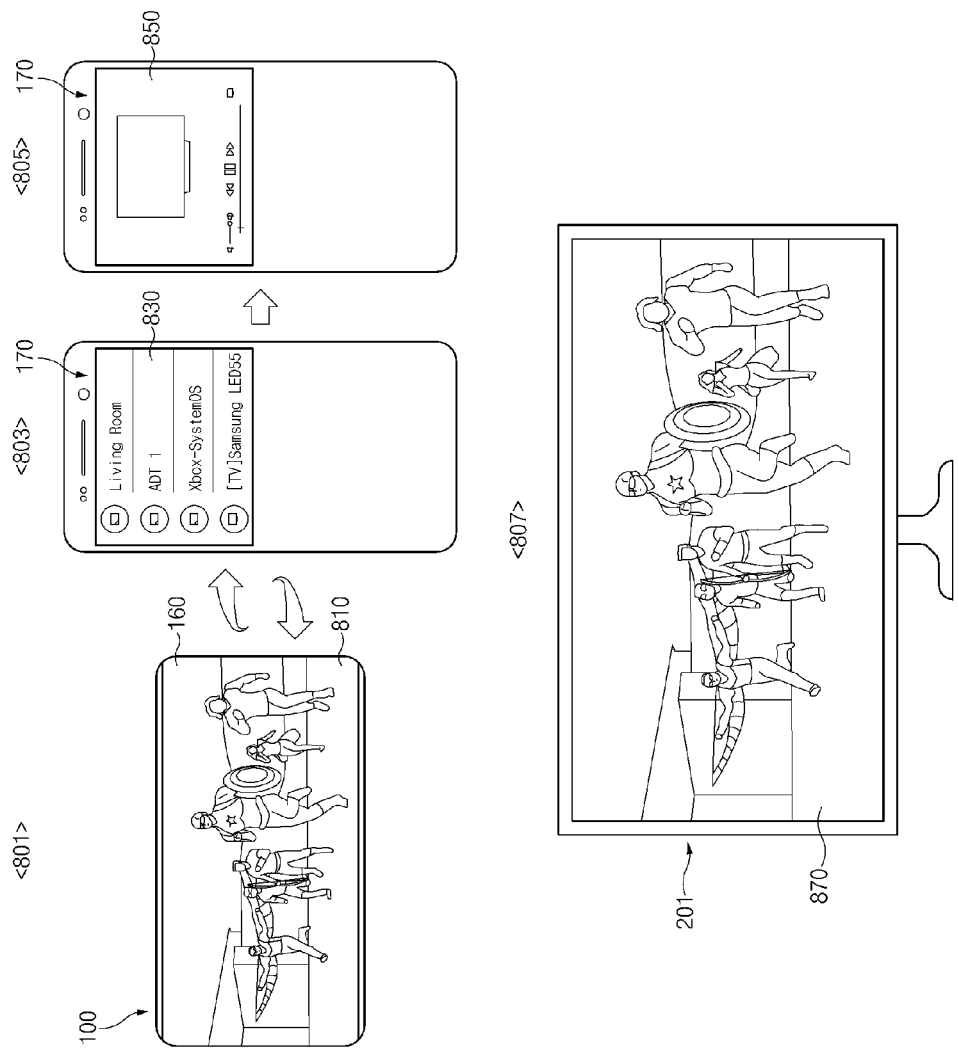
FIG. 8 illustrates a screen interface associated with performing a function of an electronic device having a plurality of displays, according to an embodiment of the present disclosure.

FIG. 8 illustrates a screen interface associated with performing a function of the electronic device having the plurality of displays, according to an embodiment of the present disclosure.

Referring to FIG. 8, as in a state 801, the electronic device 100 may output a function execution screen 810 on the first display 160 in response to execution of a specified application. For example, the electronic device 100 may execute a video playback application and may output, on the first display 160, the function execution screen 810 according to playback of a selected video. Here, in the case where the electronic device 100 is arranged in a horizontal direction, the function execution screen 810 may be output depending on the screen aspect ratio of the first display 160 arranged in the horizontal direction.

In the state in which the first display 160 is directed toward the front side, the posture of the electronic device 100 may be changed such that the second display 170 is directed toward the front side, as in a state 803. In the case where the second display 170 is directed toward the front side, the electronic device 100 may search for neighboring external electronic devices by using a short range communication module. If the search for external electronic devices is completed, then the electronic device 100 may output a list of external electronic devices on the second display 170 as first additional information 830, as illustrated in FIG. 8. For example, in the case where the first display 160 is rearranged in the state 803 so as to be directed toward the front side, the electronic device 100 may play back the video and may output a video playback screen according to the playback of the video, as in the state 801. The electronic device 100 may temporarily stop playing back the video while the electronic device 100 is searching for neighboring external electronic devices and outputting the first additional information 830 on the second display 170. Alternatively, the electronic device 100 may temporarily stop playing back the video and may turn off the first display 160. The first additional information 830 may include identification information, position information, or the like of the external electronic devices and may be information configured for the external electronic devices, and the external electronic devices may provide the information to the electronic device 100 while the electronic device 100 is performing the external electronic device scan operation.

The electronic device 100 may establish a communication channel with an external electronic device satisfying a specified condition, among the external electronic devices in the list. For example, the electronic device 100 may establish a communication channel with a TV monitor 201. If the communication channel is established with the TV monitor 201, the electronic device 100 may output second additional information 850 such as a control screen, associated with the playback of the video, as in a state 805. According to an embodiment of the present disclosure, the electronic device 100 may output, on the second display 170, a screen that includes a virtual key for controlling the volume of the video, controlling the playback speed of the video, pausing or replaying the video, adjusting the brightness of the video playback screen, and the like. The electronic device 100 may also output a screen that includes a virtual key for controlling turn-on or turn-off of the TV monitor 201.

The electronic device 100 may transmit application execution data such as display data and audio data, according to the playback of the video to the TV monitor 201, which is an external electronic device, while outputting the second additional information 850 on the second display 170. In this operation, the electronic device 100 may transmit, to the TV monitor 201, display data appropriate for the resolution, screen aspect ratio, or screen size of the TV monitor 201. If the posture of the electronic device 100 is changed such that the first display 160 is directed toward the front side, the electronic device 100 may return to the state 801 from the state 805 in which the second additional information 850 is output on the second display 170. The TV monitor 201 may output a function execution screen 870 in response to the received application execution data. The function execution screen 870 may be substantially the same as the function execution screen 810 output on the electronic device 100, or may have a screen aspect ratio different from that of the function execution screen 810.

Figure 9:
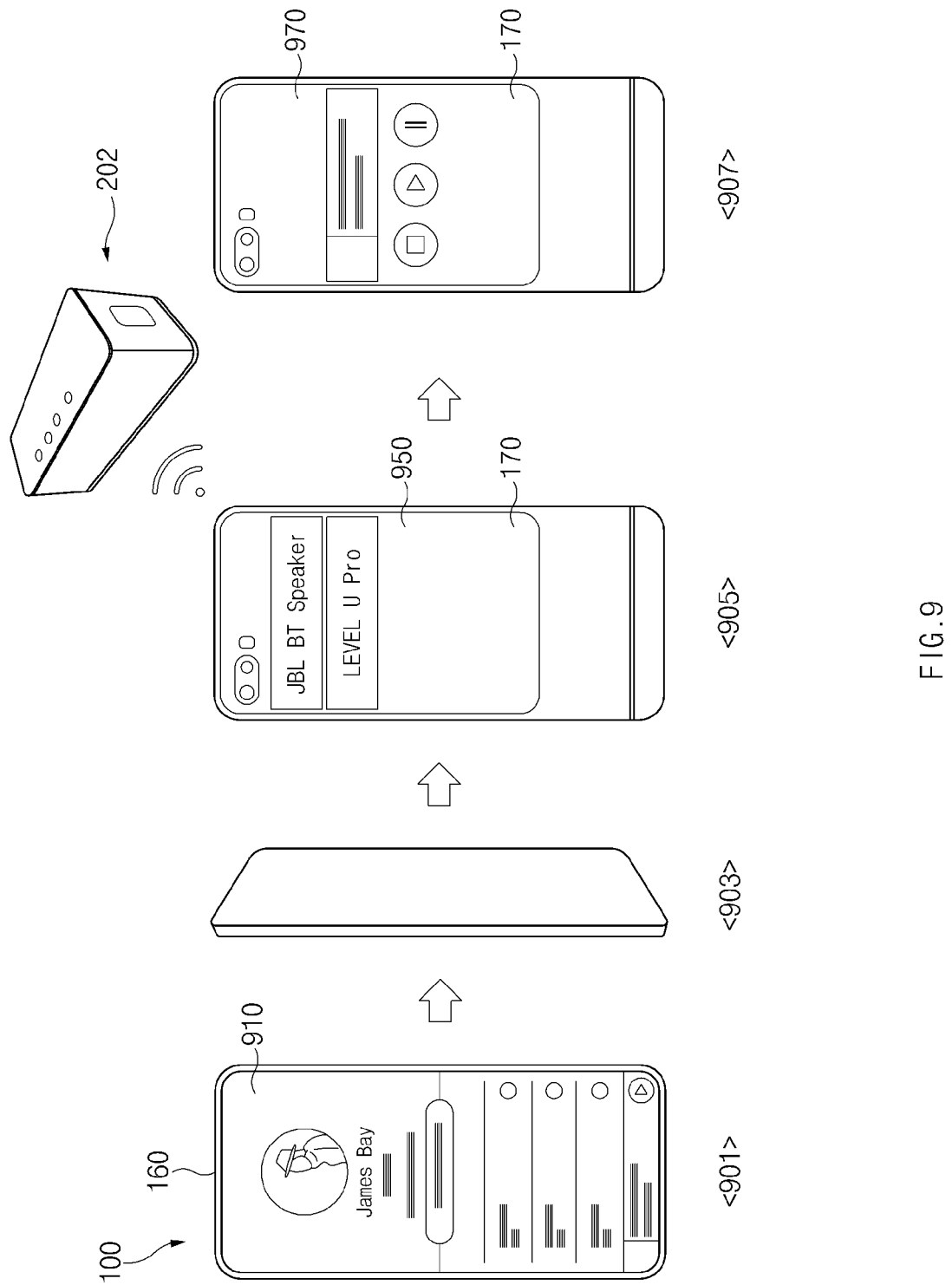
FIG. 9 illustrates a screen interface associated with performing a function of an electronic device having a plurality of displays, according to an embodiment of the present disclosure.

FIG. 9 illustrates a screen interface associated with performing a function of the electronic device having the plurality of displays, according to an embodiment of the present disclosure.

Referring to FIG. 9, as in a state 901, the electronic device 100 may output a function execution screen 910 according to execution of a specified application. For example, the electronic device 100 may execute an audio output application, such as a radio application or a music playback application, in response to a user input or according to a set schedule. According to an embodiment, the electronic device 100 may maintain the first display 160 in a turned-off state while executing the audio output application. Accordingly, the electronic device 100 may output, through a speaker, audio data according to the execution of the audio output application while maintaining the first display 160 in the turned-off state.

As in a state 903, the direction that the first display 160 faces and the direction that the second display 170 faces may be changed in response to a user operation. The electronic device 100 may turn on the second display 170 while the first display is rotating from right to left (or from left to right). For example, the electronic device 100 may turn on the second display 170 in the case where the electronic device 100 rotates to a specified angle or more in a predetermined direction in the state in which the first display 160 is directed toward the front side. If the first display 160 is in a turned-on state, the electronic device 100 may turn off the first display 160 at the time when the electronic device 100 rotates to a specified angle or more.

In the case where the second display 170 is arranged to face a specified direction or in the case where the electronic device 100 rotates to a specified angle or more, the electronic device 100 may output, on the second display 170, a list of external electronic devices as first additional information 950, as in a state 905. In this regard, the electronic device 100 may identify the type of running application such as an audio output application, and may search for external electronic devices associated with an audio output. The electronic device 100 may output, on the second display 170, the discovered first additional information 950, such as a list of external electronic devices, associated with an audio output. According to an embodiment, the electronic device 100 may search for an external electronic device such as an external speaker device 202, associated with an audio output and may output the first additional information 950 based on the search result. If a specified external electronic device item, such as an external speaker device item, is selected from the first additional information 950, the electronic device 100 may transmit audio data to the external speaker device 202.

In the case where only one of the discovered external electronic devices has an audio output function, the electronic device 100 may automatically establish a communication channel with the corresponding external electronic device. If a plurality of external electronic devices associated with an audio output are discovered, the electronic device 100 may establish a communication channel with one external electronic device on the basis of the recent connection history or the greatest number of connection histories. Alternatively, the electronic device 100 may establish a communication channel with an external electronic device having the best wireless signal strength or an external electronic device located at the shortest distance from the electronic device 100. In this regard, the electronic device 100 may perform an operation of exchanging signals with the external electronic devices, or the electronic device 100 may perform a scanning operation associated with the detection of wireless signal strength. In another case, the electronic device 100 may determine the distance from the external electronic devices by using sensor information such as a sensor signal received from at least one of an ultrasonic sensor, an infrared sensor, and an image sensor. In another case, the electronic device 100 may establish communication channels with the plurality of discovered external electronic devices.

As in a state 907, the electronic device 100 may output an output control screen for the audio output application as second additional information 970. Alternatively, the electronic device 100 may output a control screen associated with control of the connected external speaker device 202 as the second additional information 970. In this operation, the electronic device 100 may output the second additional information 970 in which information associated with running contents such as contents name, playback time, total playback time, and the like is included. The electronic device 100 may return to the state 901 if specified sensor information according to an operation of directing the first display 160 toward the front side or sensor information according to an operation of changing the rotation angle of the electronic device 100 within a specified angle range, is obtained in the state 905 or 907. In the case where the electronic device 100 returns to the state 901, the electronic device 100 may deactivate the communication channel with the external speaker device 202 and may output audio data through a speaker included in the electronic device 100. The electronic device 100 may maintain the function of outputting audio data through the external speaker device 202 even when the electronic device 100 changes from the state 907 to the state 901.

The electronic device 100 may output a virtual key associated with completion of an audio data output function through the external speaker device 202, in a specified region of at least one of the first display 160 and the second display 170. If a user input associated with completion of the function occurs, the electronic device 100 may end the running application, may turn off the second display 170, and may deactivate the communication channel connected with the external speaker device 202. Here, the electronic device 100 may transmit, to the external speaker device 202, an instruction associated with the ending to change the external speaker device 202 to a sleep state or turn off the external speaker device 202.

Figure 10:
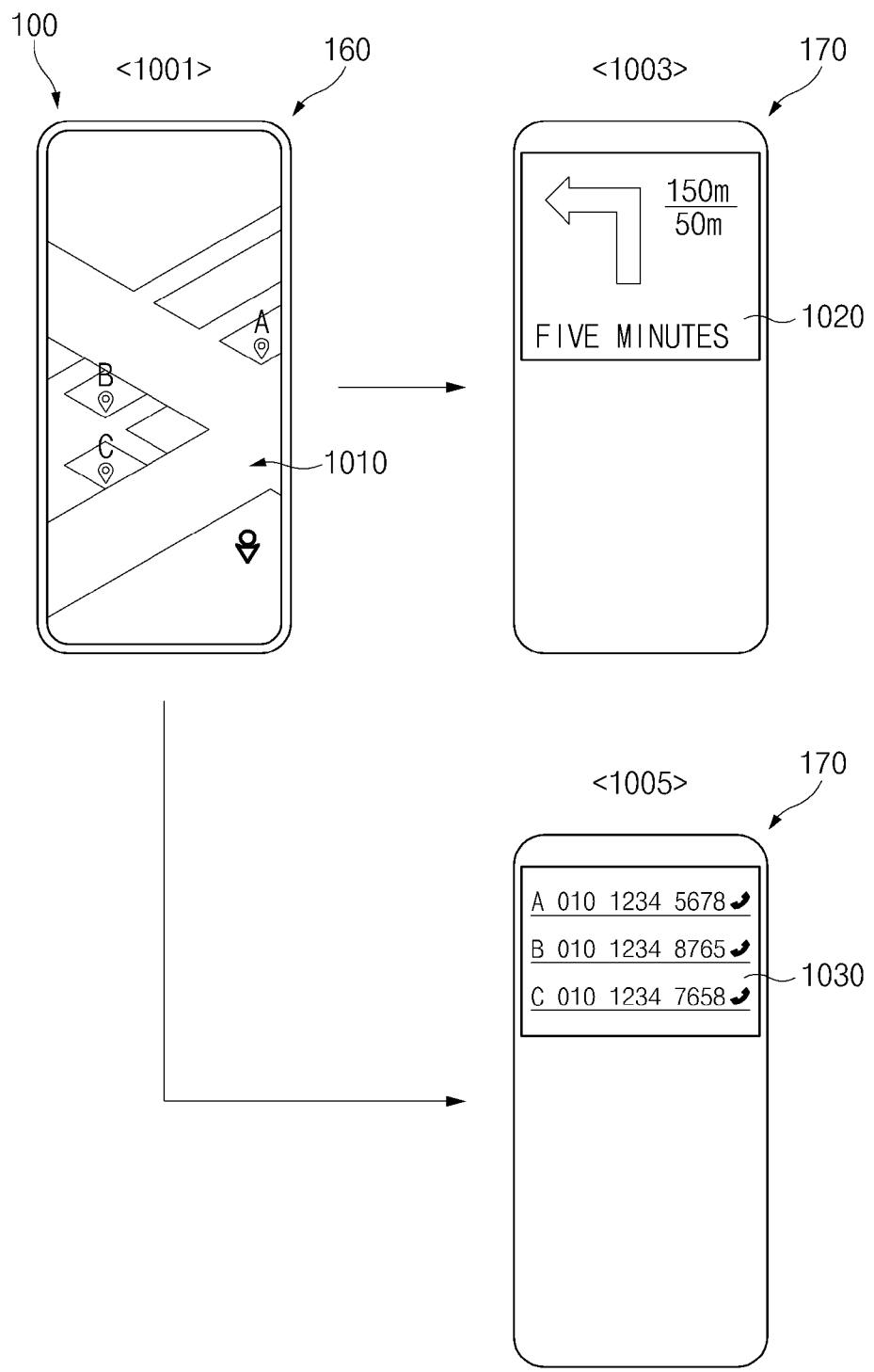
FIG. 10 illustrates a screen interface associated with performing a map-related function of an electronic device having a plurality of displays, according to an embodiment of the present disclosure.

FIG. 10 illustrates a screen interface associated with performing a map-related function of the electronic device having the plurality of displays, according to an embodiment of the present disclosure.

Referring to FIG. 10, the electronic device 100 may output a function execution screen 1010 including map information on the first display 160, as in a state 1001, according to execution of a specified application. The function execution screen 1010 may represent, for example, the point where the electronic device 100 is currently located, and discovered points A, B, and C corresponding to input search terms. The discovered points A, B, and C may be points such as a pharmacy, coffee shop, restaurant, private academy, movie theater, and the like, discovered in response to user inputs and may include points within a predetermined distance from the electronic device 100. The magnification, or scale, of the function execution screen 1010 may be varied in response to a user input. The function execution screen 1010 may include map information that includes a wider or narrower area with respect to the position of the electronic device 100 or a position of a specified point, with a change in the magnification of the function execution screen 1010.

The electronic device 100 may output first additional information 1020 on the second display 170 in the case where specified sensor information is obtained while the function execution screen 1010 is being displayed, or sensor information corresponding to an operation of indicating a first direction by the second display 170 is generated as first sensor information in the state in which the first display 160 indicates the first direction. The first additional information 1020 may include navigation information to be used by a user to go to a specified place from the point where the electronic device 100 is located. The specified place may be any one of the discovered points A, B, and C. The specified place may be a point selected by the user, among the discovered points A, B, and C. Alternatively, the specified place may be the closet point to the electronic device 100, among the discovered points A, B, and C. The first additional information 1020 may include, for example, the distance (e.g., 150 m) from the current position of the electronic device 100 to a first discovered point (e.g., the point A), required time according to a means of transport (e.g., 5 minutes on foot), and the like. Furthermore, the first additional information 1020 may include information (e.g., a bent arrow) for indicating a change of direction during a trip, the distance (e.g., 50 m) from the current position to a point at which a progress direction has to be changed, and the like.

The electronic device 100 may output second additional information 1030 on the second display 170, as in a state 1005, in the case where the first sensor information is generated while the function execution screen 1010 is being output on the first display 160. The second additional information 1030 may include a plurality of pieces of connection information by which telephone call connections are established with the discovered points A, B, and C. The plurality of pieces of connection information may include telephone numbers registered to correspond to the discovered points A, B, and C. In response to a user input for selecting specific connection information among the second additional information 1030, the electronic device 100 may attempt a telephone call connection based on the corresponding connection information. Alternatively, the electronic device 100 may attempt a telephone call connection by automatically selecting connection information of the closest point to the electronic device 100, among the plurality of pieces of connection information.

The electronic device 100 may return to the state 1001 if second sensor information corresponding to an operation of rotating the electronic device 100 to allow the first display 160 to face the first direction is generated in the state in which the first additional information 1020 is displayed on the second display 170 or in the state in which the second additional information 1030 is displayed on the second display 170.

The first display 160 may be disposed on the entire area of a face of the electronic device 100. The second display 170 may be disposed on part of a face of the electronic device 100 and may have a smaller size than the first display 160.

Figure 11:
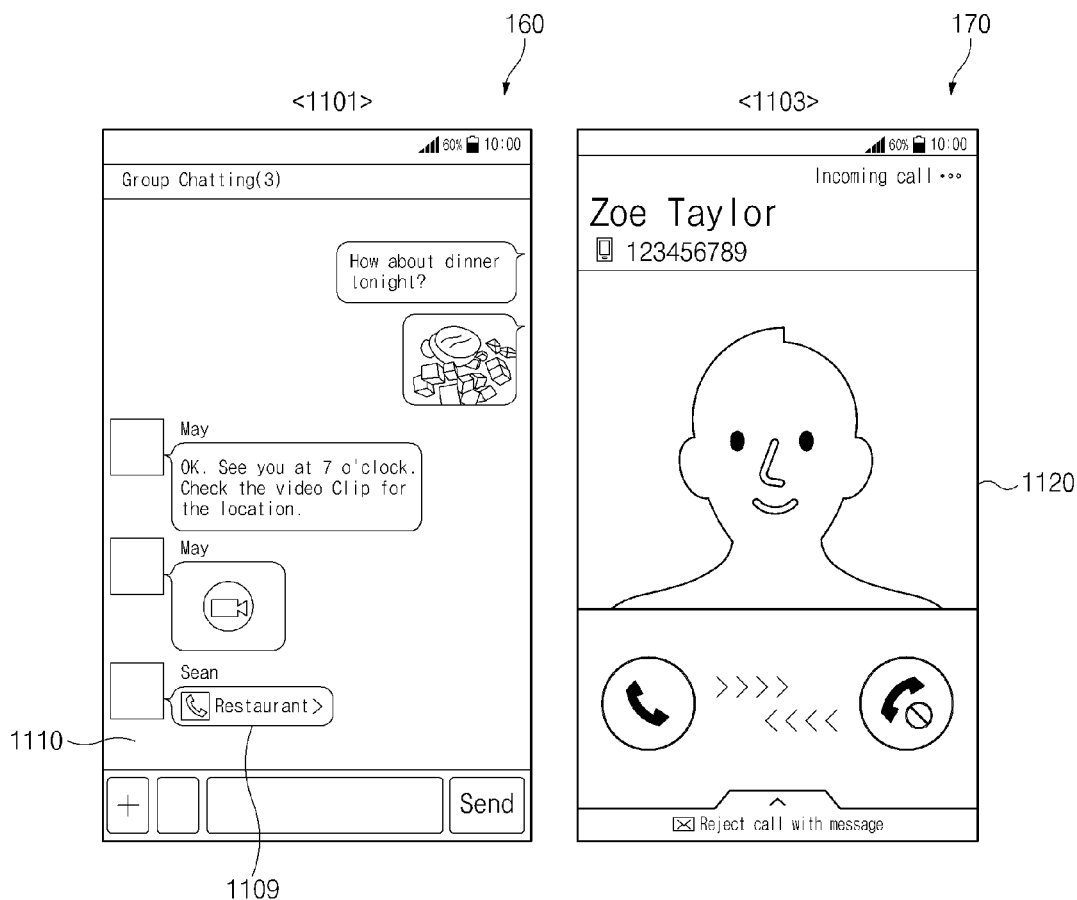
FIG. 11 illustrates a screen interface associated with performing a chat-related function of an electronic device having a plurality of displays, according to an embodiment of the present disclosure.

FIG. 11 illustrates a screen interface associated with performing a chat-related function of the electronic device having the plurality of displays, according to an embodiment of the present disclosure.

Referring to FIG. 11, the electronic device 100 may output a message function execution screen 1110 on the first display 160 facing a first direction, as in a state 1101, in response to a user input or receiving a message. The message function execution screen 1110 may include, for example, messages received from external electronic devices, messages sent by the electronic device 100, and the like. The message function execution screen 1110 may output a message including connection information 1109 such as a telephone number or information to which the telephone number is linked.

If first sensor information including an operation of rotating the electronic device 100 within a predetermined angle range in a specified direction, is obtained, the electronic device 100 may output additional information 1120 on the second display 170 facing the first direction, as in a state 1103. In this operation, the electronic device 100 may execute a telephone call connection function based on the connection information 1109 included in the message function execution screen 1110. The additional information 1120 may include, for example, a screen corresponding to the execution of the telephone call connection function. At least part of the additional information 1120 may be varied in response to the execution of the telephone call connection function. For example, during a telephone call connection attempt, the additional information 1120 may include a screen according to the attempt of the telephone call connection. In the case where a traffic channel is established, the additional information 1120 may include a screen according to the establishment of the traffic channel. In the case where the telephone call connection is completed, the additional information 1120 may include a screen such as a home screen or a specified screen, according to the completion of the telephone call connection.

The electronic device 100 may return to the state 1101 if second sensor information such as an operation of rotating the electronic device 100 in a direction similar to or different from that of the first sensor information, is obtained.

For example, the first and second displays 160 and 170 may have the same size and resolution, as illustrated in FIG. 11. Alternatively, as described above, the second display 170 may have a smaller size and a lower resolution than the first display 160, and vice versa.

Figure 12:
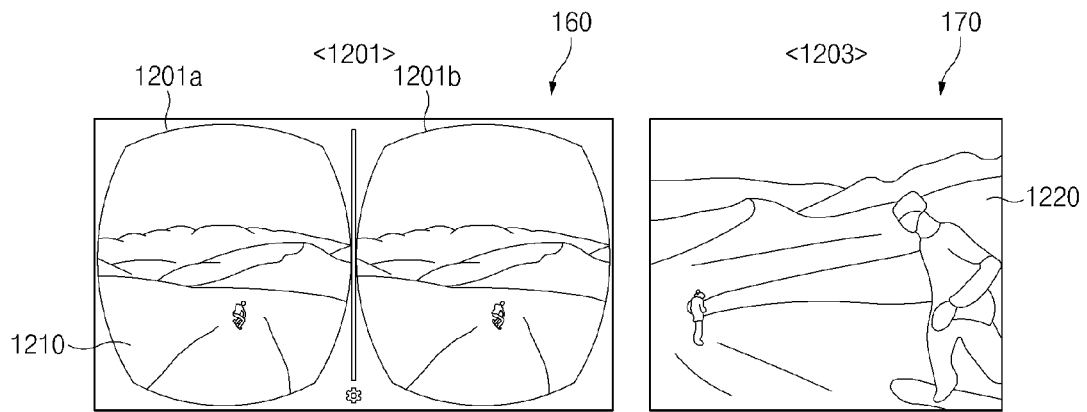
FIG. 12 illustrates a screen interface associated with performing a head mount device (HMD)-related function of an electronic device having a plurality of displays, according to an embodiment of the present disclosure.

FIG. 12 illustrates a screen interface associated with performing an HMD-related function of the electronic device having the plurality of displays, according to an embodiment of the present disclosure.

Referring to FIG. 12, in response to execution of virtual reality (VR) contents, the electronic device 100 may divide the first display 160 into a left eye display area 1201a and a right eye display area 1201b and may identically display a function execution screen 1210 both in the left eye display area 1201a and in the right eye display area 1201b, as in a state 1201. A user having put on an HMD device may identify the left eye display area 1201a and the right eye display area 1201b with his/her left and right eyes, respectively. The electronic device 100 may output additional information 1220 on the second display 170, as in a state 1203, while outputting the function execution screen 1210 both in the left eye display area 1201a and in the right eye display area 1201b of the first display 160. The additional information 1220 may include an image screen specified in relation to the function execution screen 1210 such as an image by which the contents are identified. Alternatively, the additional information 1220 may include an image that is substantially the same as the function execution screen 1210. The electronic device 100 may be mounted on the HMD device such that the second display 170 is observed from the outside. For example, the first display 160 may be arranged such that the user having put on the HMD device watches the first display 160 through the inside of the HMD device, and at least part of the second display 170 may be exposed to the outside such that the contents that the user having put on the HMD device watches are viewed from the outside.

The additional information 1220 may be output on the second display 170 while the specified function execution screen 1210 is being output on the first display 160. For example, the electronic device 100 may activate the second display 170 and may output the additional information 1220 on the second display 170 in the case where there is an age limit for requested contents to be executed. Here, the additional information 1220 may include the function execution screen 1210 according to the execution of the contents, summary information for explaining the running contents, or the like. Alternatively, the electronic device 100 may output the additional information 1220 through the second display 170 in the case where there are additional charges for the requested contents to be executed. Here, the additional information 1220 may include additional charge information, payment confirmation information, or the like.

According to various embodiments of the present disclosure, the electronic device 100 may divide the first display 160 into two areas and may output the function execution screen 1210 in the two areas, as in the state 1201, before the electronic device 100 is mounted on the HMD device. In this operation, the second display 170 may be maintained in a turned-off state. In the case where the electronic device 100 is mounted on the HMD device, the electronic device 100 may turn on the second display 170 to output the additional information 1220 corresponding to the function execution screen 1210. The additional information 1220 may be output for a predetermined period of time and may then be stopped. If there is a specified touch input on the second display 170, the electronic device 100 may turn on the second display 170 again and may output the additional information 1220 for a predetermined period of time.

Figure 13:
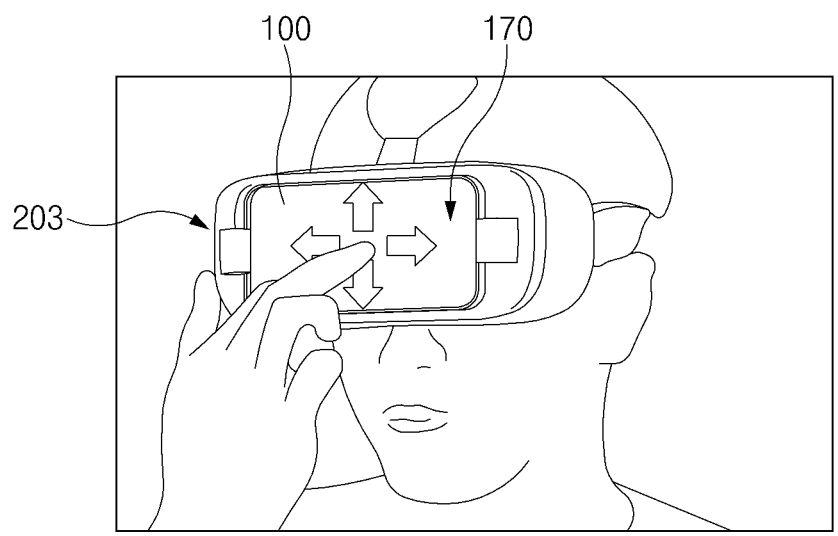
FIG. 13 illustrates a screen interface associated with performing a head mounted device (HMD)-related function of an electronic device having a plurality of displays, according to another embodiment of the present disclosure.

FIG. 13 illustrates a screen interface associated with performing an HMD-related function of the electronic device having the plurality of displays, according to another embodiment of the present disclosure.

Referring to FIG. 13, the electronic device 100 may configure the second display 170 to perform a navigation function while the electronic device 100 is mounted on an HMD device 203. For example, the electronic device 100 may output a menu screen or at least one item selection screen on the first display 160 if the electronic device 100 is mounted on the HMD device 203. In this operation, the electronic device 100 may provide the second display 170 for a navigation function and may move a cursor identified through the first display 160 according to a user operation, in response to a touch input through the second display 170. If a tap event occurs through the second display 170 in the state in which the cursor overlaps an item displayed on the first display 160, the electronic device 100 may select and execute the item overlapping the cursor.

The electronic device 100 may provide the second display 170 for a navigation function while the menu screen or the item selection screen is being output. In this regard, while outputting a function execution screen according to the execution of the item on the first display 160, the electronic device 100 may output, on the second display 170, additional information associated with the function execution screen. If the item is completely executed, the electronic device 100 may provide the second display 170 again for a navigation function. While FIG. 13 illustrates that the second display 170 occupies the entire area of the rear face of the electronic device 100, the present disclosure is not limited thereto. For example, the second display 170 may be provided in a region of the rear face of the electronic device 100, as illustrated in FIG. 8.

Figure 14:
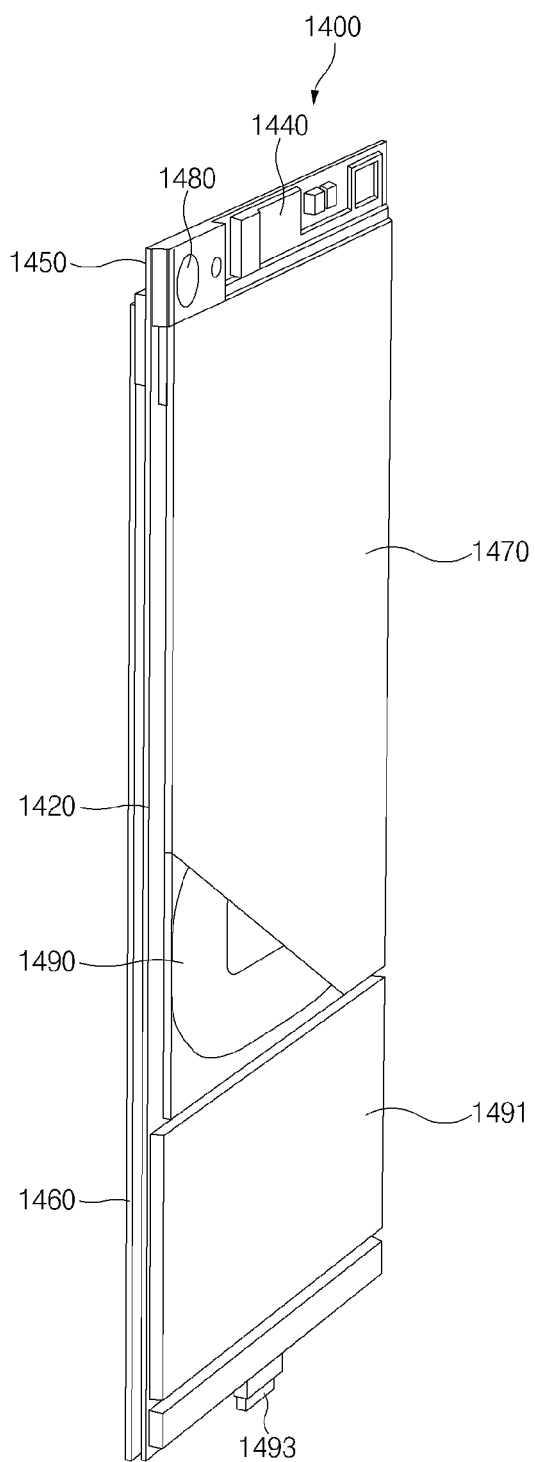
FIG. 14 illustrates a plurality of displays according to an embodiment of the present disclosure.

FIG. 14 illustrates a plurality of displays according to an embodiment of the present disclosure.

Referring to FIG. 14, an electronic device 1400 including a plurality of displays may include a first display 1460, a second display 1470, a battery 1491, a camera 1480, a sensor 1440, an audio device 1450, a main board 1420, a connector 1493, and a wireless charging device 1490. A housing that covers the first display 1460 and the second display 1470 is not illustrated in the drawing. In the case where the housing is disposed, the battery 1491, the wireless charging device 1490, the main board 1420, the connector 1493, the sensor 1440, and the audio device 1450 may be disposed inside the housing so as not to be observed from the outside.

The first display 1460 may be disposed on almost all or at least part of a first, or front, face of the electronic device 1400. The first display 1460 may be driven by a processor and a memory mounted on the main board 1420. The second display 1470 may be disposed on part of a second, or rear, face of the electronic device 1400. Likewise to the first display 1460, the second display 1470 may be driven by a processor and a memory mounted on the main board 1420. According to various embodiments, the electronic device 1400 may also include a first processor and a first memory for driving the first display 1460 and a second processor and a second memory for driving the second display 1470.

The battery 1491 may be disposed on a side of the second face on which the second display 1470 is disposed. The battery 1491 may supply power necessary for driving the first display 1460 and second display 1470. The battery 1491 may be recharged by the wireless charging device 1490. Alternatively, the battery 1491 may be recharged through the connector 1493.

The camera 1480 may be disposed on a side such as the second face, of the electronic device 1400. The camera 1480 may be disposed on a side of the rear face such as on an upper side of the rear face, on which the second display 1470 is disposed. The camera 1480 may include, a plurality of cameras such as a wide-angle camera and a telephoto camera.

The sensor 1440 may be disposed adjacent to the camera 1480 such as on a side of the second face. The sensor 1440 may include a proximity sensor for sensing the proximity of an object, an illuminance sensor for measuring illuminance, or the like.

The audio device 1450 may process an audio output function of the electronic device 1400. The audio device 1450 may include a receiver, a speaker, or the like.

The wireless charging device 1490 may be disposed below the second display 1470. The wireless charging device 1490 may receive power and supply the power to the battery 1491 based on a magnetic resonance method.

The main board 1420 may have devices or elements mounted thereon, which are necessary for driving the electronic device 1400. The main board 1420 may have processors or memories mounted thereon, as mentioned above.

As described above, the electronic device 1400 may have a structure that includes the first display 1460 disposed on substantially the entire first face of the electronic device 1400, and the second display 1470 disposed on part of the second face of the electronic device 1400 and having a rear face on which the wireless charging device 1490 is disposed.

Figure 15:
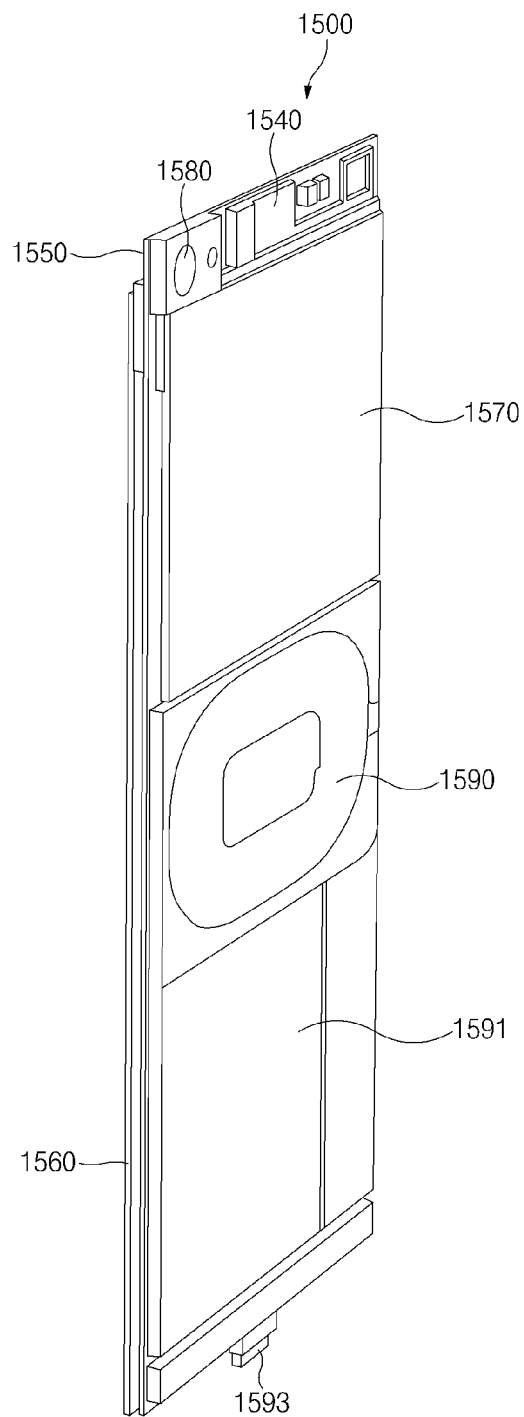
FIG. 15 illustrates a plurality of displays according to an embodiment of the present disclosure.

FIG. 15 illustrates a plurality of displays according to another embodiment of the present disclosure.

Referring to FIG. 15, an electronic device 1500 including a plurality of displays may include a first display 1560, a second display 1570, a battery 1591, a camera 1580, a sensor 1540, an audio device 1550, a connector 1593, and a wireless charging device 1590. In addition, the electronic device 1500 may further include a main board having processors and memories mounted thereon, which are necessary for driving the first display 1560 and the second display 1570. A housing may be provided that covers the first display 1560 and the second display 1570. In the case where the housing is disposed, the battery 1591, the wireless charging device 1590, the main board, the connector 1593, the sensor 1540, and the audio device 1550 may be disposed inside the housing so as not to be observed from the outside.

The first display 1560, the camera 1580, the sensor 1540, the audio device 1550, the main board, and the connector 1593 of the above-described electronic device 1500 may be substantially the same as or similar to the elements illustrated in FIG. 14.

The second display 1570 may have a smaller size than the second display 1470 illustrated in FIG. 14. The second display 1570 may be disposed so as not to overlap the wireless charging device 1590.

The battery 1591 may be disposed beside the wireless charging device 1590. The battery 1591 may be recharged by the wireless charging device 1590 or the connector 1593.

The wireless charging device 1590 may be disposed on a side of a second face of the electronic device 1500 so as not to overlap the second display 1570. The wireless charging device 1590 may be implemented by a magnetic resonance method and a magnetic induction method.

As described above, the electronic device 1500 may have a structure that includes the first display 1560 disposed on substantially the entire first face of the electronic device 1500 and the second display 1570 disposed on part of the second face of the electronic device 1500 so as to be located beside the wireless charging device 1590.

Figure 16:
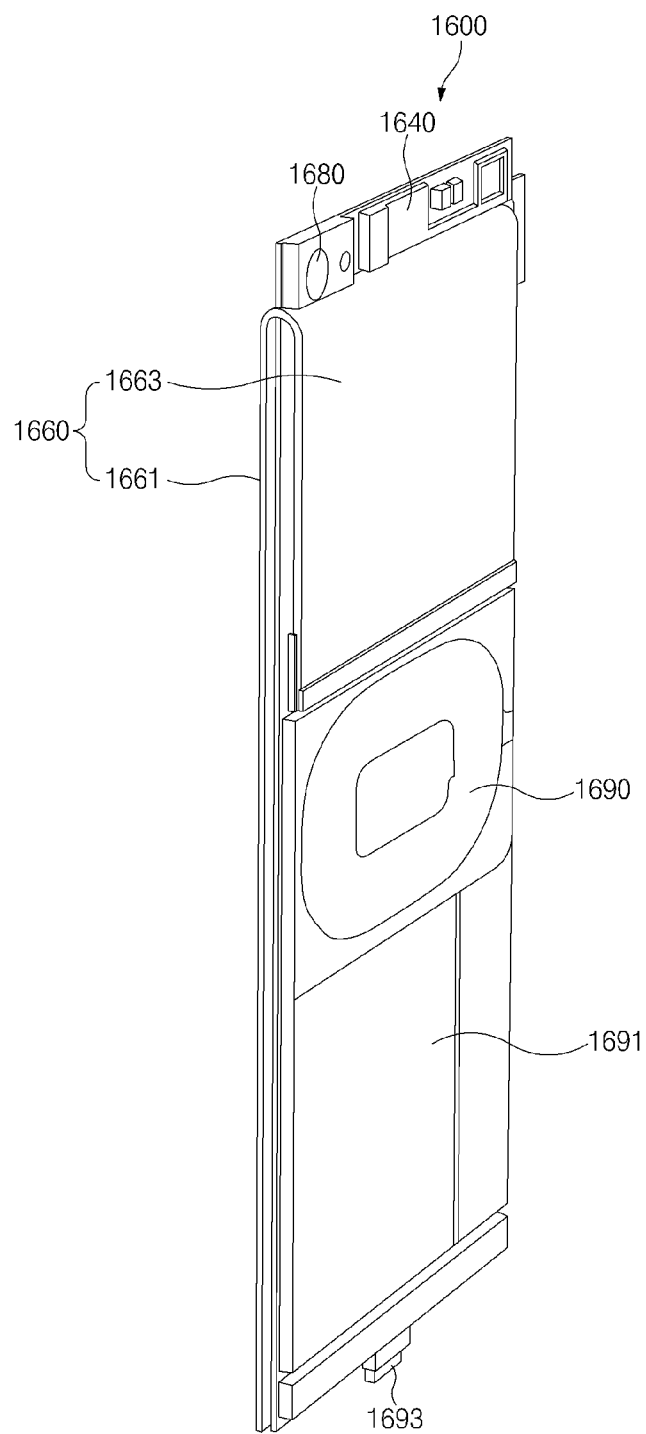
FIG. 16 illustrates a plurality of displays according to an embodiment of the present disclosure.

FIG. 16 illustrates a plurality of displays according to another embodiment of the present disclosure.

Referring to FIG. 16, an electronic device 1600 including a plurality of displays according to an embodiment may include a flexible display 1660 such as a first display area 1661 and a second display area 1663, a battery 1691, a camera 1680, a sensor 1640, a connector 1693, and a wireless charging device 1690. In addition, the electronic device 1600 may further include an audio device, a main board, and the like. A housing that covers the flexible display 1660 may be provided. In the case where the housing is disposed, the battery 1691, the wireless charging device 1690, the main board, the connector 1693, the sensor 1640, and the audio device may be disposed inside the housing so as not to be observed from the outside.

The battery 1691, the camera 1680, the sensor 1640, the audio device, the main board, the connector 1693, and the wireless charging device 1690 of the above-described electronic device 1600 may be substantially the same as or similar to the elements illustrated in FIG. 15.

The first display area 1661 of the flexible display 1660 may be disposed on a first, or front, face of the electronic device 1600, and the second display area 1663 of the flexible display 1660 may be disposed on a second, or rear, face of the electronic device 1600. The first display area 1661 and the second display area 1663 may be connected with each other. The flexible display 1660 may be disposed on the first and second faces of the electronic device 1600 such that the connecting portion between the first display area 1661 and the second display area 1663 is bent. The electronic device 1600 may further include a separate side structure for connecting the camera 1680, the sensor 1640, and the audio device to the main board such that the first display area 1661 and the second display area 1663 are connected with each other.

As described above, the electronic device 1600 may include the single flexible display 1660, and the flexible display 1660 may have a structure that includes the first display area 1661 disposed on substantially the entire first face of the electronic device 1600 and the second display area 1663 disposed on part of the second face of the electronic device 1600 so as to be located beside the wireless charging device 1690. Embodiments of the present disclosure are provided merely to easily describe technical details of the present disclosure and to help the understanding of the present disclosure, and are not intended to limit the scope of the present disclosure. Therefore, it should be construed that all modifications and changes or various other embodiments based on the technical idea of the present disclosure fall within the scope of the present disclosure.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first display arranged to face a first direction;
   a second display arranged to face a second direction;
   a memory configured to store display data to be output on the first display or the second display; and
   a processor electrically connected with the first display, the second display, and the memory,
   wherein the processor is configured to:
   execute an application;
   output, on the first display, a function execution screen corresponding to the application;
   receive a specified input; and
   output, on the second display, additional information associated with the function execution screen while transmitting application execution data according to the execution of the application to an external electronic device.

2. The electronic device of claim 1, wherein the processor is further configured to:
   turn off the first display and turn on the second display in a case where the second display is arranged to face the first direction in a state in which the first display faces the first direction, and
   output the additional information on the second display.

3. The electronic device of claim 1, wherein the processor is further configured to:
   obtain a list of connectable external electronic devices if the specified input is received;
   output the obtained list of the external electronic devices on the second display;
   select an external electronic device according to a specified condition; and
   transmit the application execution data to the selected external electronic device.

4. The electronic device of claim 3, wherein the processor is further configured to:
   receive a user input;
   transmit the application execution data to a specific external electronic device selected by the user input, wherein the specific external electronic device includes any one of an external electronic device having a recent connection history, an external electronic device having the greatest number of connection histories, an external electronic device having a wireless signal strength greater than or equal to a specified strength, an external electronic device having the strongest wireless signal strength, or an external electronic device located at the shortest distance from the electronic device, among the external electronic devices in the obtained list.

5. The electronic device of claim 1, wherein the processor is further configured to output a control screen associated with operation control of the external electronic device as the additional information while the application execution data is being output through the external electronic device.

6. The electronic device of claim 5, wherein the processor is further configured to:
   receive a user input associated with an operation control; and
   transmit control information to the external electronic device according to the user input.

7. The electronic device of claim 1, wherein the processor is further configured to output the additional information including a control screen associated with playback control of display data that is associated with the application execution data while the application execution data is being output through the external electronic device.

8. The electronic device of claim 1, wherein the processor is further configured to:
   obtain a type of the application;
   determine an external electronic device associated with the type of the application;
   establish a connection with the determined external electronic device; and
   transmit the application execution data to the determined external electronic device.

9. The electronic device of claim 8, wherein the processor is further configured to:
   establish a communication channel with at least one external electronic device capable of outputting audio data according to the execution of the application in a case where the application is an audio output application; and
   transmit the audio data to the at least one external electronic device.

10. The electronic device of claim 8, wherein the processor is further configured to:
    establish a communication channel with at least one external electronic device capable of outputting audio and a video in a case where the application is an audio-video output application; and
    transmit audio data and video data to the at least one external electronic device.

11. A method for operating an electronic device including a first display arranged to face a first direction and a second display arranged to face a second direction, the method comprising:
    executing an application;
    outputting, on the first display, a function execution screen corresponding to the application;
    receiving a specified input;
    transmitting application execution data according to the execution of the application to an external electronic device in response to receiving the specified input; and
    outputting, on the second display, additional information associated with the function execution screen.

12. The method of claim 11, wherein receiving the specified input includes:
    receiving sensor information according to an operation of arranging the second display to allow the second display to face the first direction in a state in which the first display faces the first direction, and
    wherein outputting the additional information includes:
    turning off the first display and turning on the second display; and
    outputting the additional information on the second display.

13. The method of claim 11, wherein transmitting the application execution data includes:
    obtaining a list of connectable external electronic devices;
    outputting the obtained list of the external electronic devices on the second display;
    selecting an external electronic device according to a specified condition; and
    transmitting the application execution data to the selected external electronic device.

14. The method of claim 13, wherein selecting the external electronic device includes:
    selecting an external electronic device by a user input among the external electronic devices in the obtained list, wherein the external electronic device includes any one of an external electronic device having a recent connection history, an external electronic device having a wireless signal strength higher than or equal to a specified strength, an external electronic device having the strongest wireless signal strength, an external electronic device located at the shortest distance from the electronic device, and an external electronic device having the greatest number of connection histories, among the external electronic devices in the obtained list.

15. The method of claim 11, wherein outputting the additional information includes:
outputting a control screen associated with operation control of the external electronic device as the additional information while the application execution data is being output through the external electronic device.

16. The method of claim 15, further comprising:
receiving a user input associated with an operation control; and
transmitting control information according to the user input to the external electronic device.

17. The method of claim 11, wherein outputting the additional information includes:
outputting the additional information including a control screen associated with playback control of display data associated with the application execution data while the application execution data is being output through the external electronic device.

18. The method of claim 11, wherein transmitting the application execution data includes:
obtaining a type of the application;
determining an external electronic device associated with the type of application;
establishing a connection with the determined external electronic device; and
transmitting the application execution data to the determined external electronic device.

19. The method of claim 11, wherein transmitting the application execution data includes:
establishing a communication channel with at least one external electronic device capable of outputting audio data according to the execution of the application in a case that the application is an audio output application; and
transmitting the audio data to the at least one external electronic device.

20. The method of claim 11, wherein transmitting the application execution data includes:
establishing a communication channel with at least one external electronic device capable of outputting audio-video data in a case that the application is an audio-video data output application; and
transmitting the audio data and the video data to the at least one external electronic device.

* * * * *